United States Patent
Ikeda et al.

(10) Patent No.: US 10,606,149 B2
(45) Date of Patent: Mar. 31, 2020

(54) INFORMATION PROCESSING DEVICE, INFORMATION PROCESSING METHOD, AND PROGRAM

(71) Applicant: Sony Corporation, Tokyo (JP)

(72) Inventors: Nobuho Ikeda, Kanagawa (JP); Hiroshi Ikeda, Tokyo (JP); Seijiro Inaba, Kanagawa (JP); Hideyuki Sato, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/094,333

(22) PCT Filed: Mar. 10, 2017

(86) PCT No.: PCT/JP2017/009658
§ 371 (c)(1),
(2) Date: Oct. 17, 2018

(87) PCT Pub. No.: WO2017/203796
PCT Pub. Date: Nov. 30, 2017

(65) Prior Publication Data
US 2019/0121217 A1    Apr. 25, 2019

(30) Foreign Application Priority Data

May 25, 2016 (JP) .................................. 2016-104170

(51) Int. Cl.
*G03B 15/00* (2006.01)
*G03B 17/18* (2006.01)
(Continued)

(52) U.S. Cl.
CPC ............. *G03B 15/00* (2013.01); *G03B 17/00* (2013.01); *G03B 17/18* (2013.01); *H04N 5/232* (2013.01); *H04N 5/247* (2013.01); *H04N 7/18* (2013.01)

(58) Field of Classification Search
None
See application file for complete search history.

(56) References Cited

U.S. PATENT DOCUMENTS 10,375,305 B2* 8/2019 Shimauchi .......... H04N 5/23238
2014/0049655 A1* 2/2014 Iwasaki .................... H04N 7/18
                                                                    348/207.1
(Continued)

FOREIGN PATENT DOCUMENTS

JP    2009-284452 A    3/2009
JP    2011-1320234 A   6/2011
(Continued)

*Primary Examiner* — William B Perkey
(74) *Attorney, Agent, or Firm* — Michael Best & Friedrich LLP

(57) ABSTRACT

[Object] Technology capable of adjusting a view angle area more easily and intuitively is desired.
[Solution] According to the present disclosure, there is provided an information processing device including: a control unit which superimposes an adjustment view angle area for adjusting a view angle area of one imaging device among a plurality of imaging devices onto the view angle area of the one imaging device. According to the present disclosure, since a control unit superimposes an adjustment view angle area onto a view angle area of one imaging device, a user can adjust the view angle area more easily and intuitively. Of course, the effects of the present disclosure are not limited thereto.

20 Claims, 26 Drawing Sheets

(51) Int. Cl.
*G03B 17/00* (2006.01)
*H04N 5/232* (2006.01)
*H04N 7/18* (2006.01)
*H04N 5/247* (2006.01)

(56) References Cited

U.S. PATENT DOCUMENTS

| | | | | |
|---|---|---|---|---|
| 2014/0204234 A1* | 7/2014 | Nonaka | H04N 5/2354 | 348/222.1 |
| 2015/0271415 A1* | 9/2015 | Uemura | H04N 5/23296 | 348/222.1 |
| 2016/0050367 A1* | 2/2016 | Shimauchi | H04N 5/23238 | 348/36 |
| 2016/0203377 A1* | 7/2016 | Irie | G08G 1/168 | 348/118 |
| 2017/0098322 A1* | 4/2017 | Ono | G09G 5/00 | |
| 2018/0109723 A1* | 4/2018 | Shimauchi | G03B 7/091 | |
| 2019/0098248 A1* | 3/2019 | Takehara | H04N 5/44504 | |
| 2019/0121217 A1* | 4/2019 | Ikeda | G03B 15/00 | |

FOREIGN PATENT DOCUMENTS

| | | |
|---|---|---|
| JP | 2013-038668 A | 2/2013 |
| JP | 2014-241496 A | 12/2014 |

\* cited by examiner

INFORMATION PROCESSING DEVICE, INFORMATION PROCESSING METHOD, AND PROGRAM

TECHNICAL FIELD

The present disclosure relates to an information processing device, an information processing method, and a program.

BACKGROUND ART

For example, as disclosed in Patent Literature 1, a technology of imaging a subject using a plurality of imaging devices is known.

CITATION LIST

Patent Literature

Patent Literature 1: JP 2014-241496A

DISCLOSURE OF INVENTION

Technical Problem

Incidentally, in such a technology, it is very important for each imaging device to perform imaging as intended by a user. For this reason, a user often adjusts a view angle area of each imaging device while checking a subject within the view angle area of each imaging device. Specifically, a user checks a subject within the view angle area by looking in a viewfinder of an imaging device. Alternatively, in a case in which an imaging device includes a display panel, the subject within the view angle area is displayed on the display panel. The user checks the subject within the view angle area by checking an image displayed on the display panel.

However, it is very troublesome to adjust a view angle area while checking it by looking at the display panel of each imaging device, and a technology which can adjust a view angle area more easily and intuitively has been desired.

In view of this, the present disclosure proposes an information processing device, an information processing method, and a program which can adjust a view angle area more easily and intuitively

Solution to Problem

According to the present disclosure, there is provided an information processing device including: a control unit which superimposes an adjustment view angle area for adjusting a view angle area of one imaging device among a plurality of imaging devices onto the view angle area of the one imaging device.

According to the present disclosure, there is provided an information processing method including: superimposing, by a processor, an adjustment view angle area for adjusting a view angle area of one imaging device among a plurality of imaging devices onto the view angle area of the one imaging device.

According to the present disclosure, there is provided a program which causes a computer to realize a control function of superimposing an adjustment view angle area for adjusting a view angle area of one imaging device among a plurality of imaging devices onto the view angle area of the one imaging device.

Advantageous Effects of Invention

As described above, according to the present disclosure, since an adjustment view angle area is superimposed on a view angle area of any one imaging device, it is possible to adjust a view angle area more easily and intuitively. Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
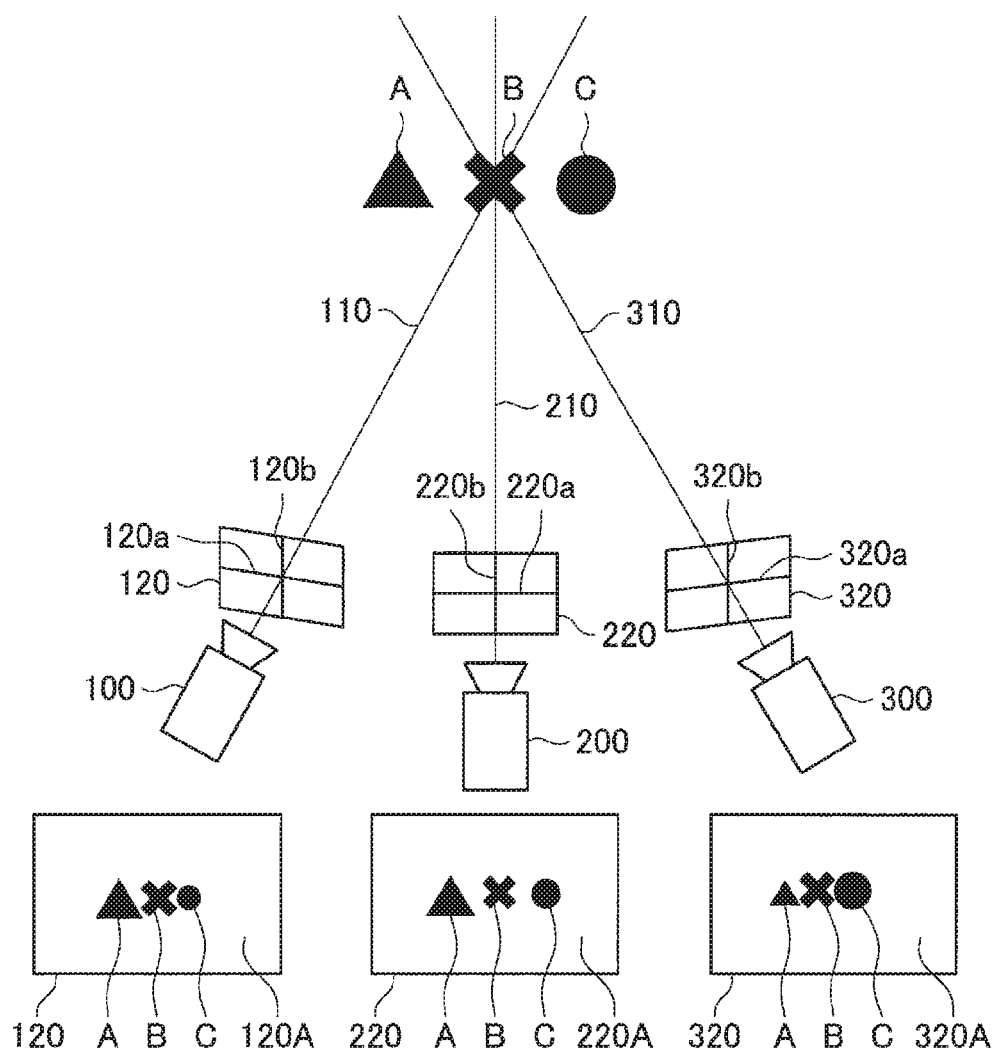
FIG. 1 is a plan view which shows an example of imaging a subject using a plurality of imaging devices.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description will be made in the following order.
1. Example of imaging subject using plurality of imaging devices
1-1. Imaging example 1 as intended by user
1-2. Imaging example 2 as intended by user
1-3. Imaging example 3 as intended by user
1-5. Imaging example 1 not as intended by user
1-6. Imaging example 2 not as intended by user
1-7. Imaging example 3 not as intended by user
2. Overview of present embodiment
3. Configuration example of imaging system according to present embodiment
4. Processing example of imaging system
5. Image example displayed on imaging device
5-1. Image example 1 displayed on imaging device
5-2. Image example 2 displayed on imaging device
5-3. Image example 3 displayed on imaging device
5-4. Image example 4 displayed on imaging device
5-5. Image example 5 displayed on imaging device
5-6. Image example 6 displayed on imaging device
5-7. Image example 7 displayed on imaging device <1. Example of Imaging Subject Using Plurality of Imaging Devices>

First, an example of imaging a subject using a plurality of imaging devices will be described. A technology of imaging a subject using a plurality of imaging devices includes so-called bullet-time imaging, cut switching imaging, and the like. The present embodiment can be applied to any technology of capturing a subject using a plurality of imaging devices. As described above, in a case in which such imaging is performed, it is very important for each imaging device to perform imaging as intended by a user. Here, users' intentions are various. For example, users' intentions include that there be no deviation in the optical axis of each imaging device (for example, that they intersect at one point in the space), that sizes of subjects shown in respective captured images be aligned, that horizontal view angle directions of respective imaging devices be aligned, and the like. In a case in which any imaging device performs imaging not as intended by a user, various types of image processing (so-called, post-production processing) are required, and as a result, degradation of image quality or the like may occur.

(1-1. Imaging Example 1 as Intended by User)

First, an imaging example 1 as intended by a user will be described with reference to FIG. 1. In FIG. 1, subjects A to C are imaged using three imaging devices 100 to 300. The imaging device 100 images a captured image 120A, the imaging device 200 images a captured image 220A, and the imaging device 300 images a captured image 320A. The subjects A to C are shown in the captured images 120A to 320A. An optical axis 110 is an optical axis of the imaging device 10X), an optical axis 210 is an optical axis of the imaging device 200, and an optical axis 310 is an optical axis of the imaging device 300. In addition, view angle areas 120 to 320 are shown in front of the imaging devices 100 to 300. The view angle areas 120 to 320 are rectangular. Sizes and positions of the view angle areas 120 to 320 are determined according to the sizes and focal lengths of the image sensors. In addition, center lines 120a to 320a in a horizontal view angle direction and center lines 120b to 320b in a vertical view angle direction are shown in the view angle areas 120 to 320. The imaging devices 100 to 300 can schematically capture images appearing within the view angle areas 120 to 320. Note that the view angle areas 120 to 320 are shown to show states of the view angle areas 120 to 320 (the sizes, rotation angles around the optical axes 120 to 320, focal lengths, and the like) of the imaging devices 100 to 300. The above precondition is the same in each imaging example below. A user's intention in the imaging example 1 is as follows.

The optical axes 110 to 310 of the imaging devices 100 to 300 intersect at one point.
Sizes of subjects B (subjects at the center) shown in the captured images 120A to 320A are aligned.
Horizontal view angle directions of the imaging devices 100 to 300 are aligned.

In the imaging example 1 shown in FIG. 1, the imaging devices 100 to 300 perform imaging as intended by the user. For this reason, it is possible to use the captured images 120A to 320A as output images as they are. Therefore, image quality of the output images is good. In addition, in a case in which these captured images 120A to 320A are sequentially displayed, viewpoints for the subjects A to C appear to move smoothly.

(1-2. Imaging Example 2 as Intended by User)

Figure 2:
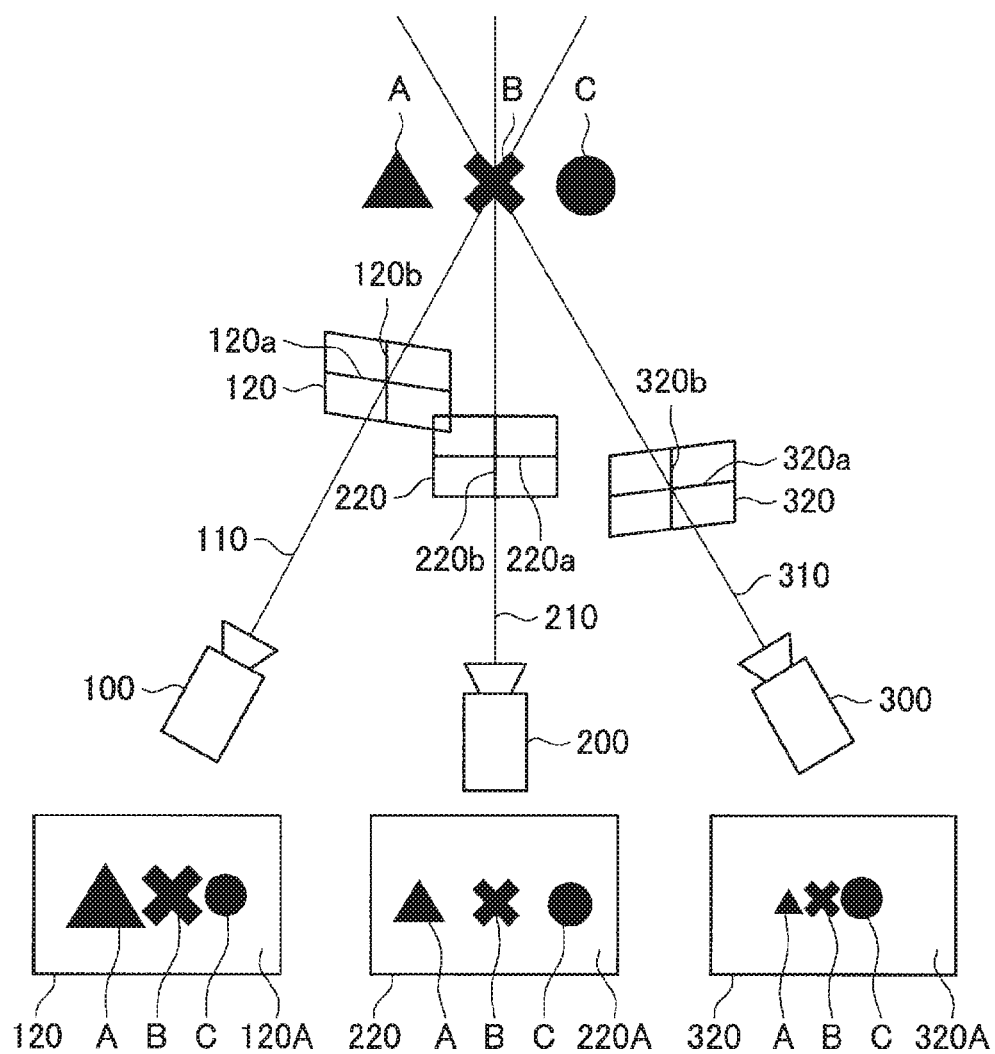
FIG. 2 is a plan view which shows an example of imaging a subject using a plurality of imaging devices.

Next, an imaging example 2 as intended by a user will be described with reference to FIG. 2. A user's intention in FIG. 2 is as follows.

The optical axes 110 to 310 of the imaging devices 100 to 300 intersect at one point.

The sizes of subjects B (subjects at the center) shown in the captured images 120A to 320A are sequentially decreased from the captured image 120A. That is, a subject B shown in the captured image 120A is the largest, and a subject B shown in the captured image 320A is the smallest.

The horizontal view angle directions of the imaging devices 100 to 300 are aligned.

In the imaging example 2 shown in FIG. 2, the imaging devices 100 to 300 perform imaging as intended by a user. For this reason, it is possible to use the captured images 120A to 320A as output images as they are. In addition, in a case in which these captured images 120A to 320A are sequentially displayed, the viewpoints for the subjects A to C appear to move smoothly, and a size of the subject B appears to change smoothly.

(1-2. Imaging Example 3 as Intended by User)

Figure 3:
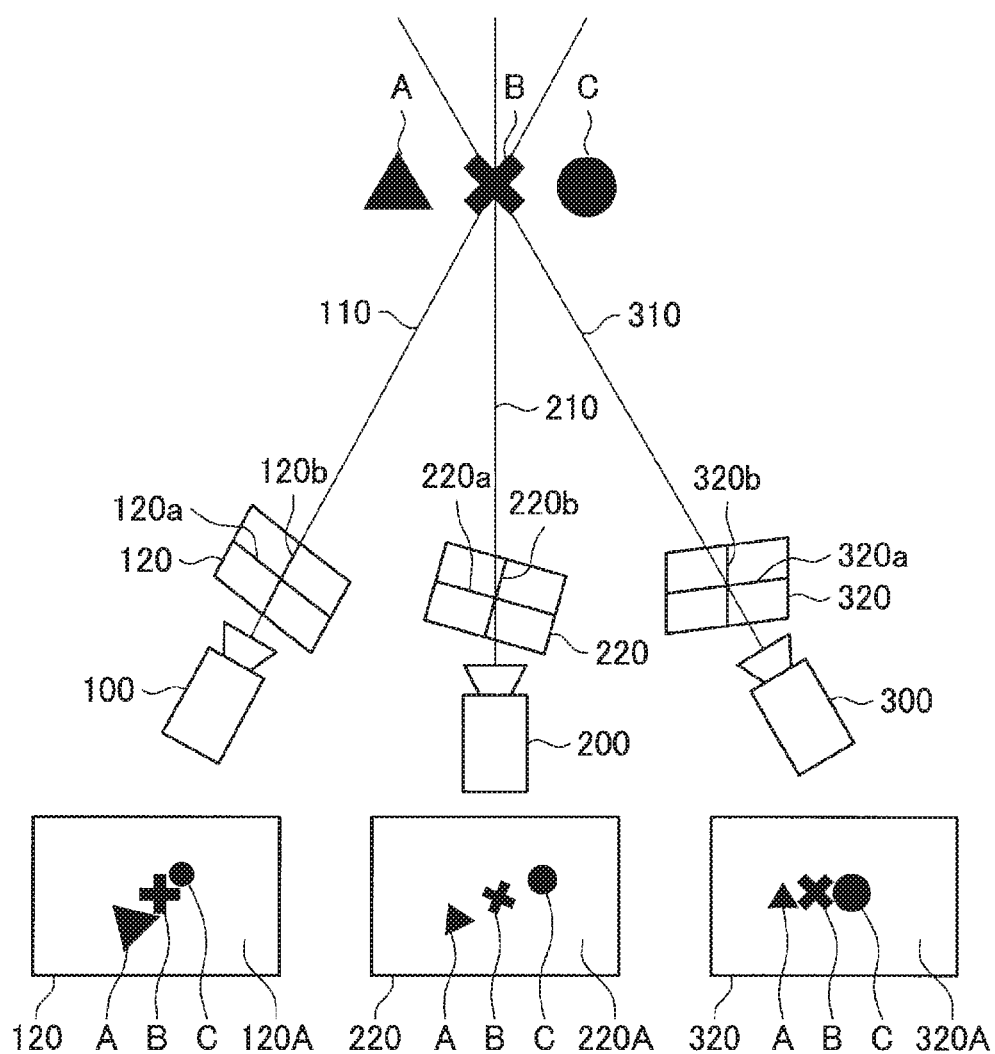
FIG. 3 is a plan view which shows an example of imaging a subject using a plurality of imaging devices.

Next, an imaging example 3 as intended by a user will be described with reference to FIG. 3. A user's intention in FIG. 3 is as follows.

The optical axes 110 to 310 of the imaging devices 100 to 300 intersect at one point.

The sizes of subjects B (subjects at the center) shown in the captured images 120A to 320A are aligned.

The horizontal view angle directions of the imaging devices 100 to 300 sequentially rotate counterclockwise from the imaging device 100.

In the imaging example 3 shown in FIG. 3, the imaging devices 100 to 300 perform imaging as intended by a user. For this reason, it is possible to use the captured images 120A to 320A as output images as they are. In addition, in a case in which these captured images 120A to 320A are sequentially displayed, the viewpoints for the subjects A to C appear to rotate smoothly.

As is apparent from the imaging examples 1 to 3, in a case in which the imaging devices 100 to 300 perform imaging as intended by a user, the quality of the output images is high, and it is possible to display the output images as intended by a user. Note that a user's intention is not limited to the above description. The user's intention includes, for example, that as much as of an area in the captured image as possible be used (in "the imaging example 1 not as intended by a user," the captured image becomes smaller). In addition, the user's intention may include only that a subject to be imaged be placed in the view angle area, that the head of a person be caused to be disposed at a center of the view angle area, that people stand vertically within the view angle area, or the like. In any case, if the imaging devices 100 to 300 perform imaging as intended by a user, a high quality output image can be obtained.

(1-4. Imaging Example 1 not as Intended by User)

Figure 4:
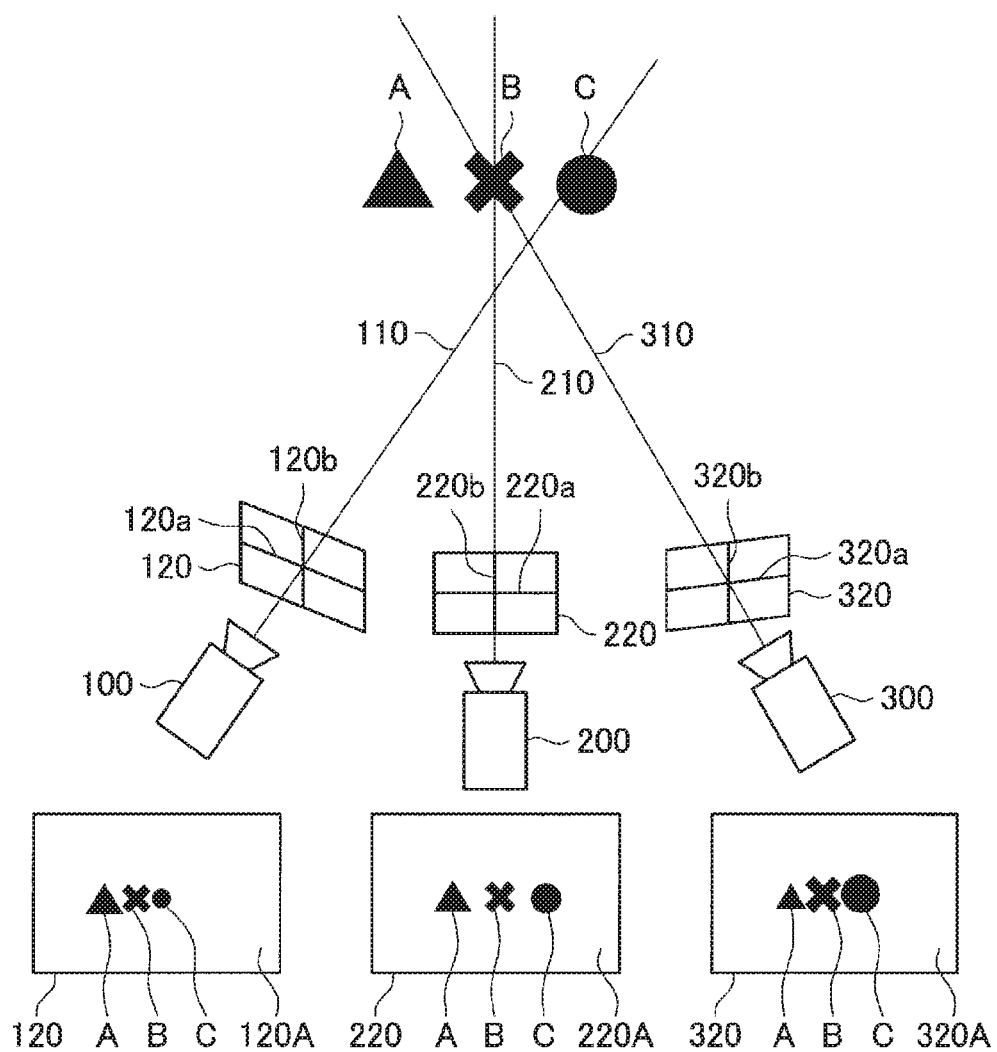
FIG. 4 is a plan view which shows an example of imaging a subject using a plurality of imaging devices.

Next, an imaging example 1 not as intended by a user will be described with reference to FIGS. 4 and 5. A user's intention in FIG. 4 is as follows.

The optical axes 110 to 310 of the imaging devices 100 to 300 intersect at one point.

The sizes of subjects B (subjects at the center) shown in the captured images 120A to 320A are aligned.

The horizontal view angle directions of the imaging devices 100 to 300 are aligned.

In the imaging example 1 shown in FIG. 4, the optical axis 110 of the imaging device 100 deviates. For this reason, the imaging device 100 does not perform imaging as intended by a user. As a result, in a case in which the captured images 120A to 320A are used as output images as they are, the viewpoints for the subjects A to C change randomly. Therefore, image processing for the captured image 120A is required. This image processing is performed by an information processing device having a hardware constituent such as a CPU, a ROM, a RAM, a hard disk, and various input devices. The same applies to other imaging examples as follows.

Figure 5:
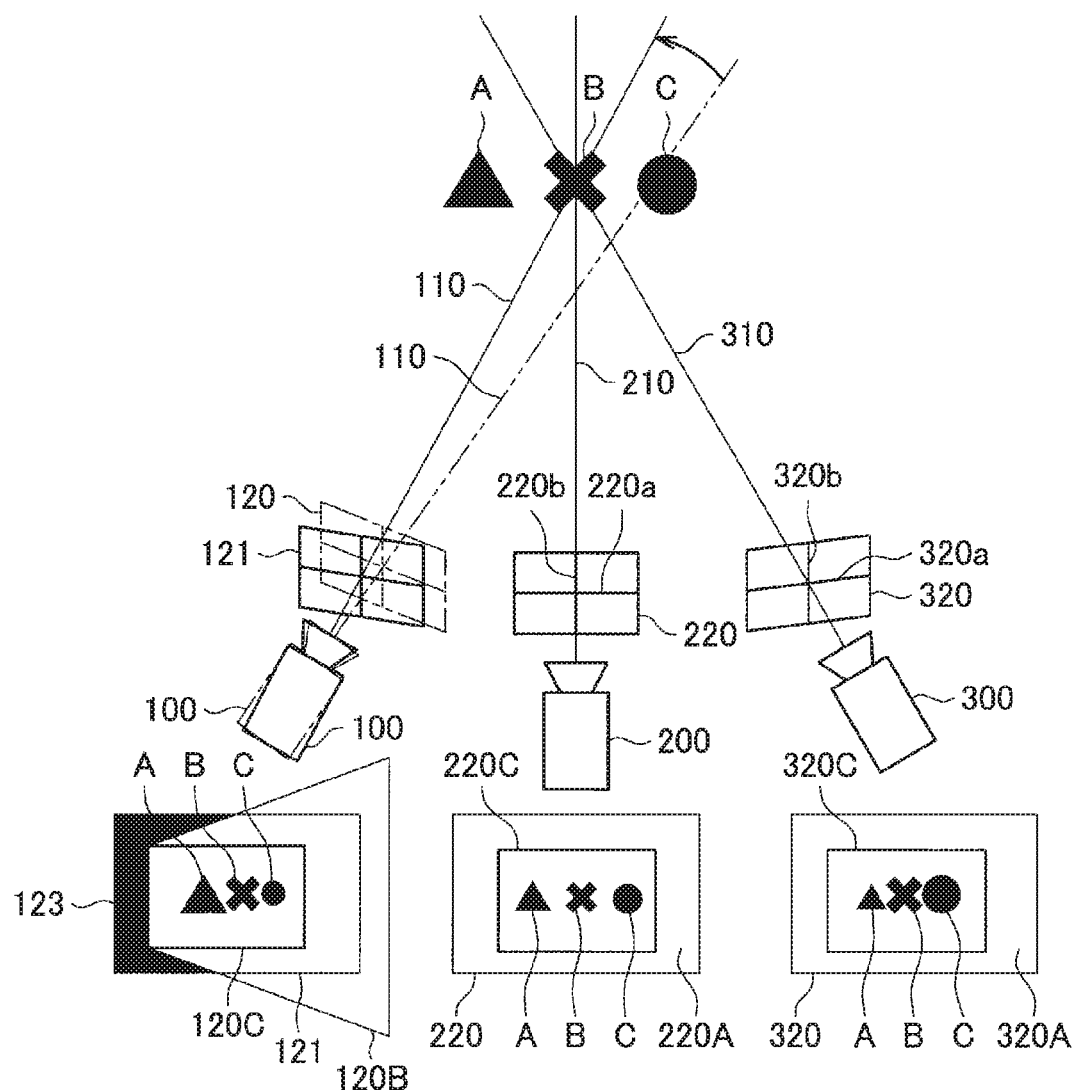
FIG. 5 is a plan view which shows an example of imaging a subject using a plurality of imaging devices.

In this image processing, first, the imaging devices 100 to 300 are mapped in a three dimensional virtual space as shown in FIG. 5. Then, a posture of the imaging device 100 is corrected such that the optical axis 110 of the imaging device 100 intersects other optical axes 210 and 310 at one point. Specifically, a rotation matrix indicating the posture of the imaging device 100 is corrected. The corrected optical axis 110 intersects the other optical axes 210 and 310 at one point. Then, a view angle area 121 corresponding to the corrected imaging device 100 and the optical axis 110 is newly set.

The imaging device 100 does not perform imaging in the view angle area 121. Therefore, an initial captured image 120A is corrected to a captured image 120B imaged in the view angle area 121. Specifically, the captured image 120A is projectively transformed on the new view angle area 121 using a corrected rotation matrix or the like. However, the captured image 120B does not completely coincide with the view angle area 121. Specifically, the view angle area 121 has an area 123 in which there is no captured image 120B (a black area). Therefore, in a case in which all images in the view angle area 121 are displayed as output images, the area 123 will be also displayed. This area 123 is displayed as, for example, a black image. This gives a viewer much discomfort. Therefore, a rectangle image 120C is cut out from the captured image 120B such that there is no black image above, below, or to the right or left of the output image. In addition, a range shown in the rectangle image 120C is different from ranges shown in other captured images 220A and 320A, and rectangle images 220C and 320C of the same size are also cut out from the other captured images 220A and 320A such that these ranges are aligned. Then, these rectangle images 120C to 320C are displayed as output images.

As a result, it is possible to display an output image that appears as intended by a user. However, an image size becomes smaller by cutting out the rectangle images 120C to 320C. Furthermore, the ranges shown in the rectangle images 120C to 320C become smaller than the original captured images 120A to 320A. Therefore, the quality of output images is degraded.

(1-5. Imaging Example 2 not as Intended by User)

Figure 6:
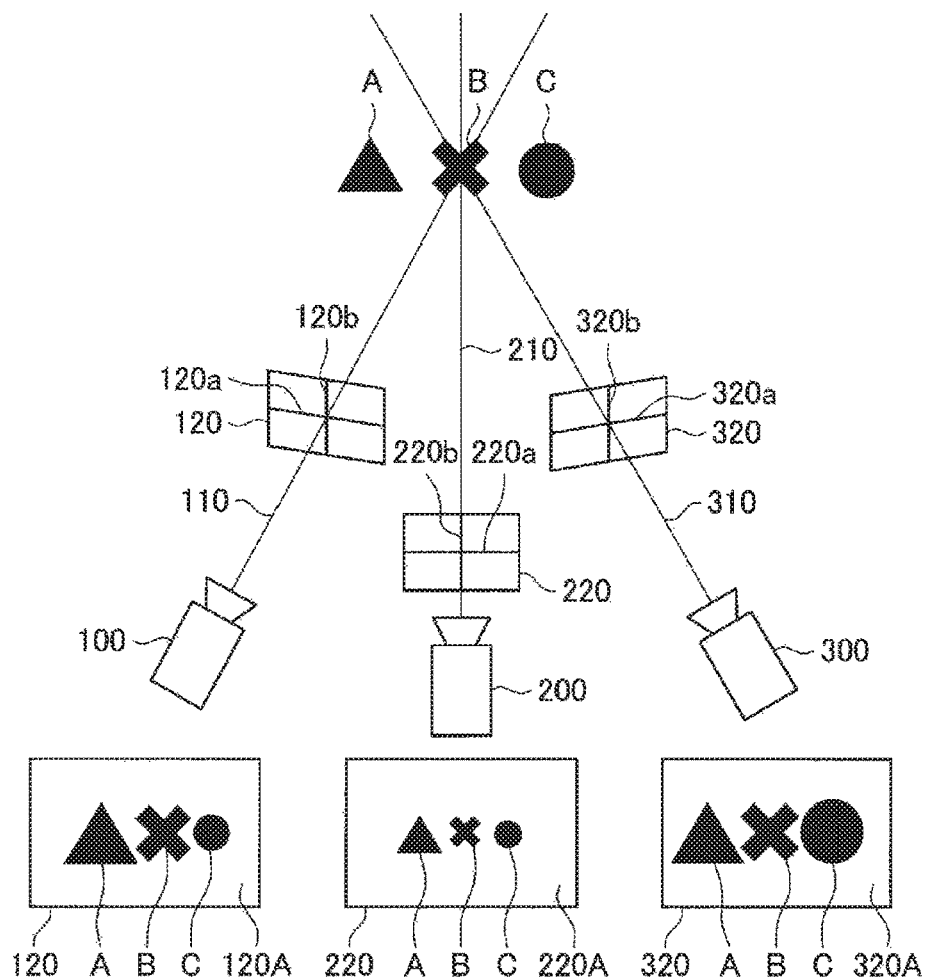
FIG. 6 is a plan view which shows an example of imaging a subject using a plurality of imaging devices.

Next, an imaging example 2 not as intended by a user will be described with reference to FIGS. 6 to 8. A user's intention in FIG. 6 is as follows.

The optical axes 110 to 310 of the imaging devices 100 to 300 intersect at one point.

The sizes of subjects B (subjects at the center) shown in the captured images 120A to 320A are aligned.

The horizontal view angle directions of the imaging devices 100 to 300 are aligned.

In the imaging example 2 shown in FIG. 6, the size of a subject B shown in the captured image 220A is different. For example, since a focal length of the imaging device 200 is different from focal lengths of other imaging devices 100 and 300, the size of a subject B is different. For this reason, in a case in which the captured images 120A to 320A are used as output images as they are, the size of a subject B changes. Therefore, this gives a viewer much discomfort. For this reason, imaging processing for the captured image 220A is required.

Figure 7:
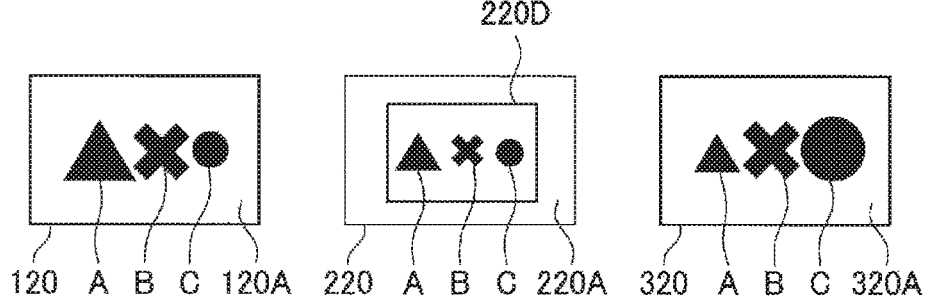
FIG. 7 is an explanatory view which shows an example of correcting a captured image.
Figure 8:
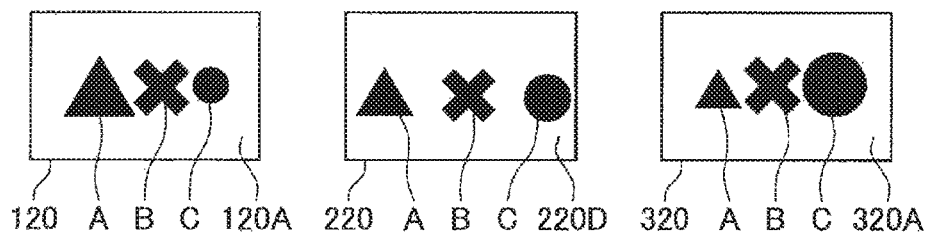
FIG. 8 is an explanatory view which shows an example of correcting a captured image.

In this image processing, first, a rectangle image 220D is cut out from the captured image 220A as shown in FIG. 7. Then, as shown in FIG. 8, the rectangle image 220D is expanded to the same size as the view angle area 220. Resolution of the expanded rectangle image 220D is lower than that of other captured images 120A and 320A. Therefore, uniformity in resolution disappears. There, a low pass filter is applied to all of these images. This causes the resolution of the images to be unified. Then, the captured image 120A, the rectangle image 220D, and the captured image 320A are displayed as output images.

As a result, it is possible to display the output images that appear as intended by a user. However, the resolution of the output images is smaller than that of the original captured images 120A to 320A. Therefore, the quality of the output images is degraded.

(1-6. Imaging Example 3 not as Intended by User)

Figure 9:
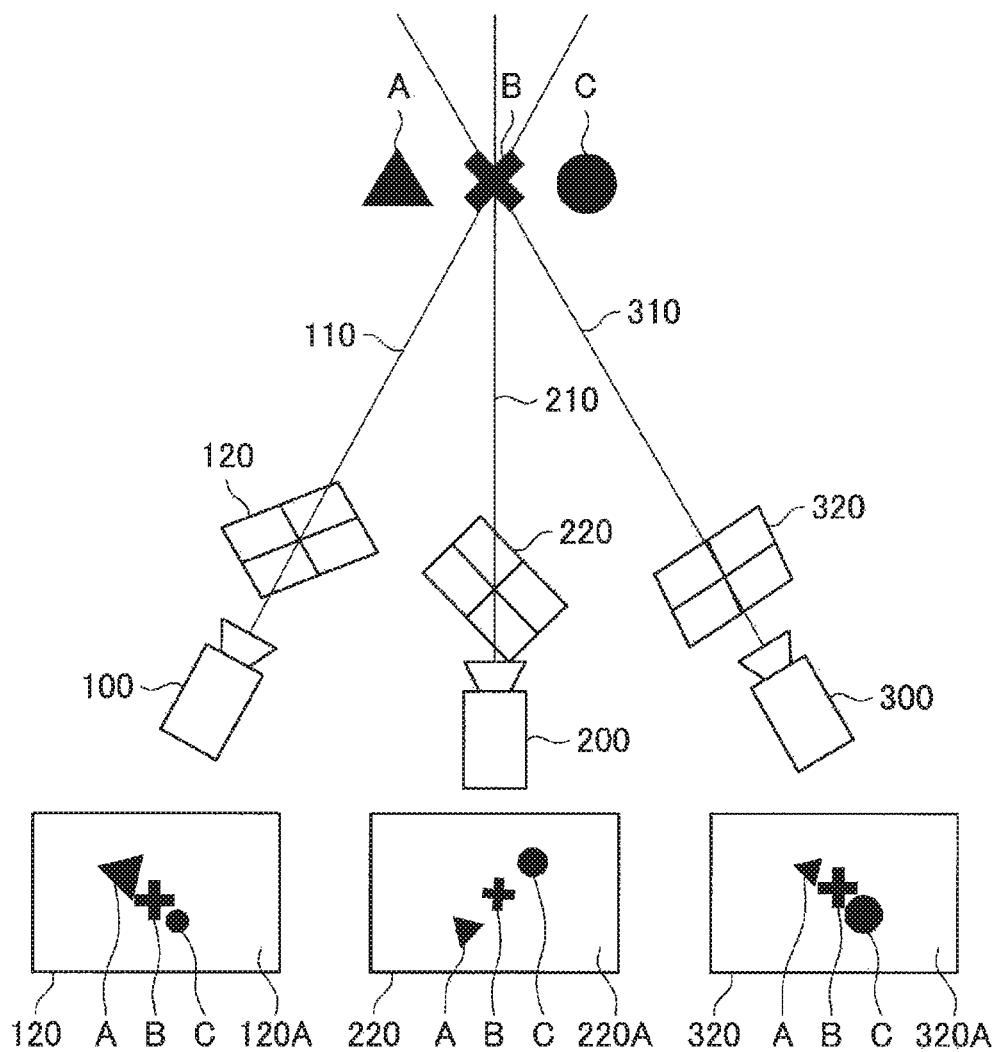
FIG. 9 is a plan view which shows an example of imaging a subject using a plurality of imaging devices.

Next, an imaging example 3 not as intended by a user will be described with reference to FIGS. 9 to 11. A user's intention in FIG. 9 is as follows.

The optical axes 110 to 310 of the imaging devices 100 to 300 intersect at one point.

The sizes of subjects B (subjects at the center) shown in the captured images 120A to 320A are aligned.

The horizontal view angle directions of the imaging devices 100 to 300 are aligned.

In the imaging example 3 shown in FIG. 9, the horizontal view angle directions of the imaging devices 100 to 300 are all different. For this reason, in a case in which the captured images 120A to 320A are used as output images as they are, orientations of the subjects A to C largely change. Therefore, this gives a viewer much discomfort. For this reason, imaging processing for the captured images 120A to 320A is required.

Figure 10:
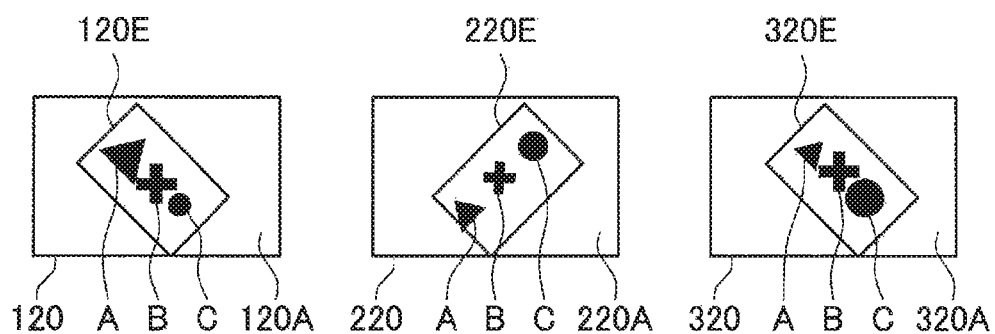
FIG. 10 is an explanatory view which shows an example of correcting a captured image.
Figure 11:
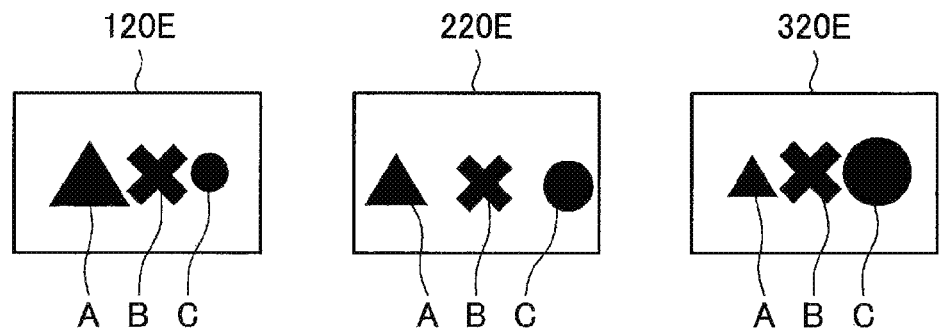
FIG. 11 is an explanatory view which shows an example of correcting a captured image.

In this image processing, first, rectangle images 120E to 320E in which the subject A to C are shown are cut out from the captured images 120A to 320A as shown in FIG. 10. Then, as shown in FIG. 11, the rectangle images 120E to 320E are expanded to the same size as the view angle areas 120 to 320, and the horizontal view angle directions thereof are aligned. Resolution of the expanded rectangle images 120E to 320E is lower than that of the original captured images 120A to 320A. Then, the rectangle images 120E to 320E are displayed as output images.

As a result, it is possible to display the output images that appear as intended by a user. However, the resolution of the output images is smaller than that of the original captured images 120A to 320A. Therefore, the quality of the output images is degraded.

In this manner, in a case in which the imaging devices 100 to 300 do not perform imaging as intended by a user, various types of image processing (so-called, post-production processing) are required, and, as a result, image quality may be degraded, and the like.

Therefore, it is very important for the imaging devices 100 to 300 to perform imaging as intended by a user. A user often adjusts the view angle area of each of the imaging devices 100 to 300 while checking the subjects A to C in the view angle area 120 to 320 of each of the imaging devices 100 to 300. Specifically, a user checks the subjects A to C in the view angle areas 120 to 320 by looking in viewfinders of the imaging devices 100 to 300. Alternatively, in a case in which the imaging devices 100 to 300 include display panels, the subjects A to C in the view angle areas 120 to 320 are displayed on the display panels. A user checks the subjects A to C in the view angle areas 120 to 320 by checking images displayed on the display panels.

However, since a view angle area serving as a standard of adjustment is not displayed in the view angle area, it is difficult for a user to ascertain how to adjust a view angle area. For this reason, it is necessary for a user to move back and forth between the imaging devices 100 to 300 several times and repeats fine adjustments. Furthermore, even if such adjustments are performed, the captured image 120A to 320A may not be as intended by a user in some cases.

For this reason, a technology which can adjust a view angle area more easily and intuitively has been desired. Therefore, a view angle area serving as a standard of adjustment, that is, an adjustment view angle area, is superimposed in the view angle area in the present embodiment. Hereinafter, the present embodiment will be described in detail.

<2. Overview of Present Embodiment>

Figure 12:
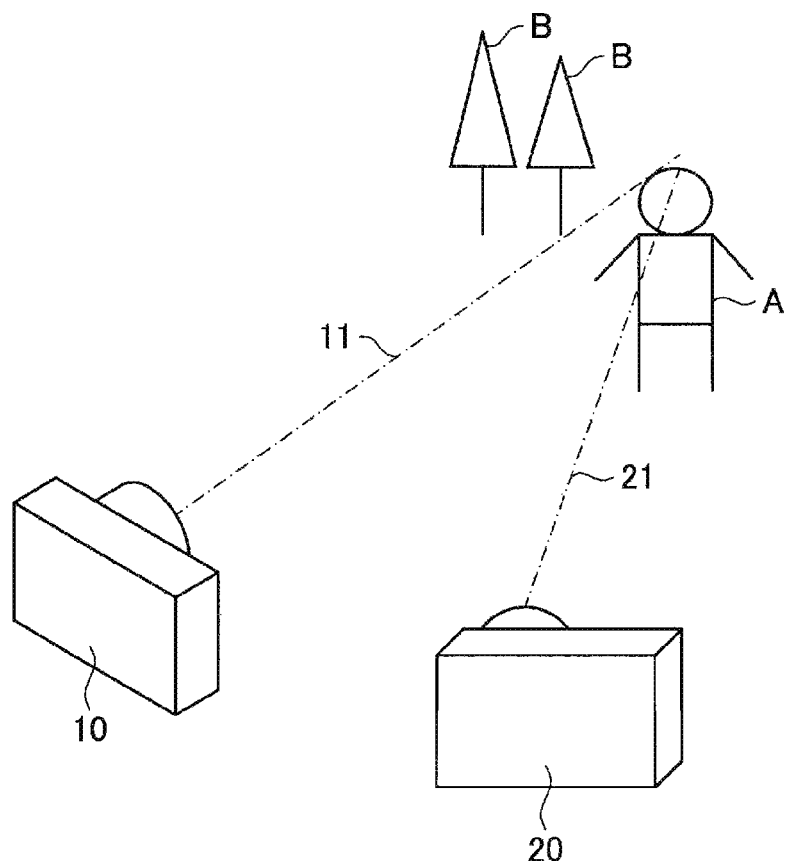
FIG. 12 is a perspective view which shows an example of imaging a subject using a plurality of imaging devices according to the present embodiment.
Figure 13:
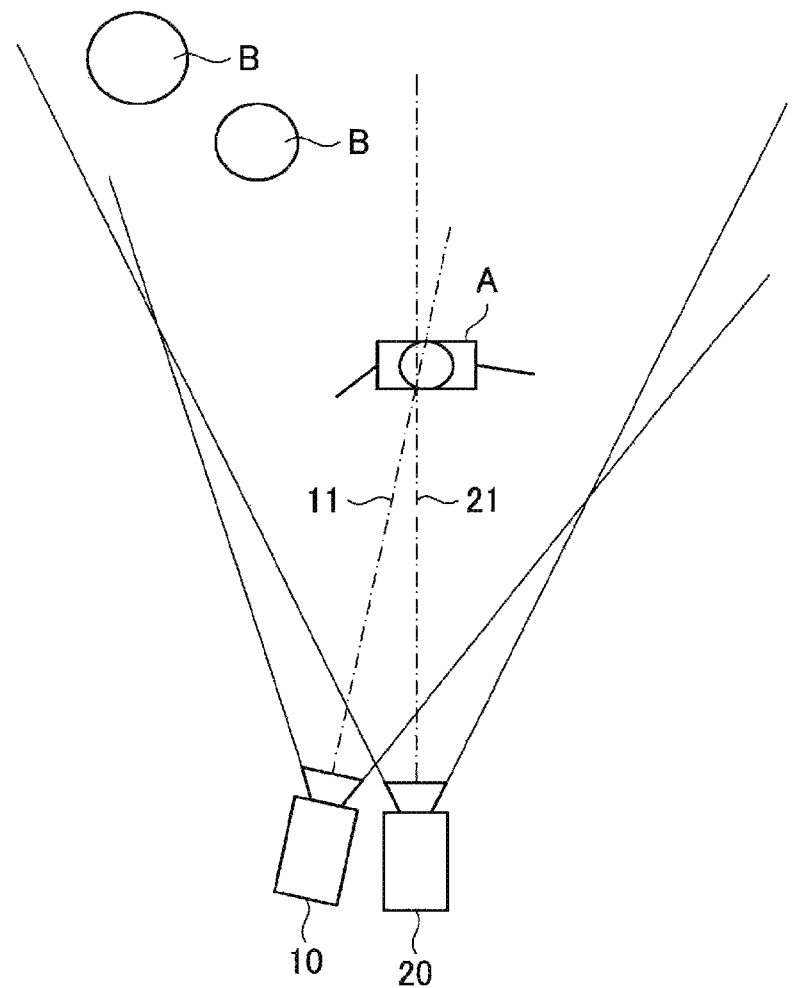
FIG. 13 is a plan view which shows an example of imaging a subject using a plurality of imaging devices according to the present embodiment.
Figure 14:
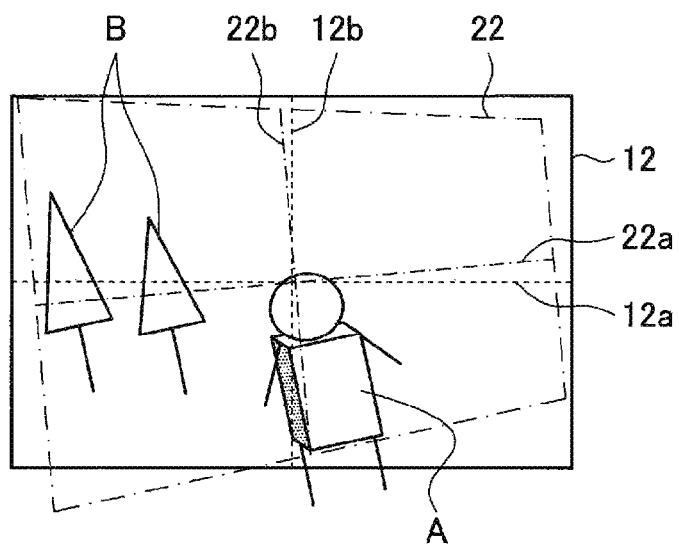
FIG. 14 is an explanatory view which shows an example of an image displayed on a display unit of each imaging device according to the present embodiment.

Next, an overview of the present embodiment will be described with reference to FIGS. 12 to 15. As shown in FIGS. 12 and 13, imaging devices 10 and 20 image subjects A and B. Optical axes 11 and 21 of the imaging devices 10 and 20 are directed to the subject A. At this time, an image shown in FIG. 14 is displayed on a display panel of the imaging device 10. That is, the subjects A and B, a view angle area 12 of the imaging device 10, a center line 12a of a horizontal view angle direction, and a center line 12b of a vertical view angle direction are displayed on the display panel of the imaging device 10. Furthermore, a view angle area 22 of the imaging device 20, a center line 22a of a horizontal view angle direction of the view angle area 22, and a center line 22b of a vertical view angle direction are displayed on the display panel as adjustment view angle areas. As a result, a user can ascertain a positional relationship between the view angle area 12 of the imaging device 10 and the view angle area 22 of the imaging device 20 intuitively and easily. Accordingly, for example, a user can easily perform an adjustment such as aligning a size of the view angle area 12 to the view angle area 22. That is, in a case in which the view angle area 12 deviates from a state intended by a user, the user can easily notice such a deviation. Furthermore, a user can perform an adjustment of the view angle area 12 more easily and intuitively. For example, in the example of FIG. 14, the horizontal view angle direction of the view angle area 12 deviates from the horizontal view angle direction of the view angle area 22. For this reason, a user can easily correct such a deviation.

Figure 15:
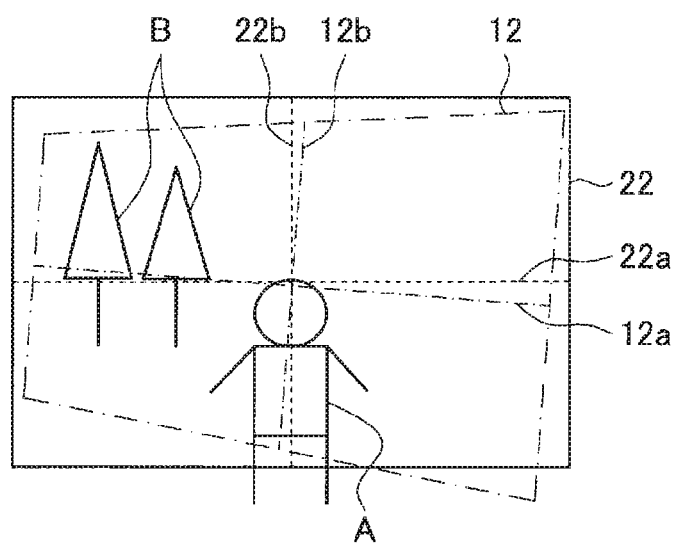
FIG. 15 is an explanatory view which shows an example of an image displayed on a display unit of each imaging device according to the present embodiment.

On the other hand, an image shown in FIG. 15 is displayed on the display panel of the imaging device 20. That is, the subjects A and B, the view angle area 22 of the imaging device 20, the center line 22a of a horizontal view angle direction, and the center line 22b of a vertical view angle direction are displayed on the display panel of the imaging device 20. Furthermore, the view angle area 12 of the imaging device 10, the center line 12*a* of a horizontal view angle direction of the view angle area 12, and the center line 12*b* of a vertical view angle direction are displayed on the display panel as adjustment view angle areas. As a result, a user can ascertain the positional relationship between the view angle area 12 of the imaging device 10 and the view angle area 22 of the imaging device 20 intuitively and easily. Accordingly, for example, a user can perform an adjustment of the view angle area 22 more intuitively and easily.

Of course, the adjustment view angle areas are not limited to the examples described above. For example, in the imaging example 1 not as intended by a user, imaging not as intended by a user occurs because the optical axis 110 of the imaging device 100 deviates. For this reason, an adjustment view angle area for checking whether the optical axes 11 and 21 of the imaging devices 10 and 20 deviate may also be displayed. A method of determining such an adjustment view angle area will be described below. In addition, the number of imaging devices is not limited to this example. Moreover, the captured images may be still images or moving images.

<3. Configuration Example of Imaging System According to Present Embodiment>

Figure 16:
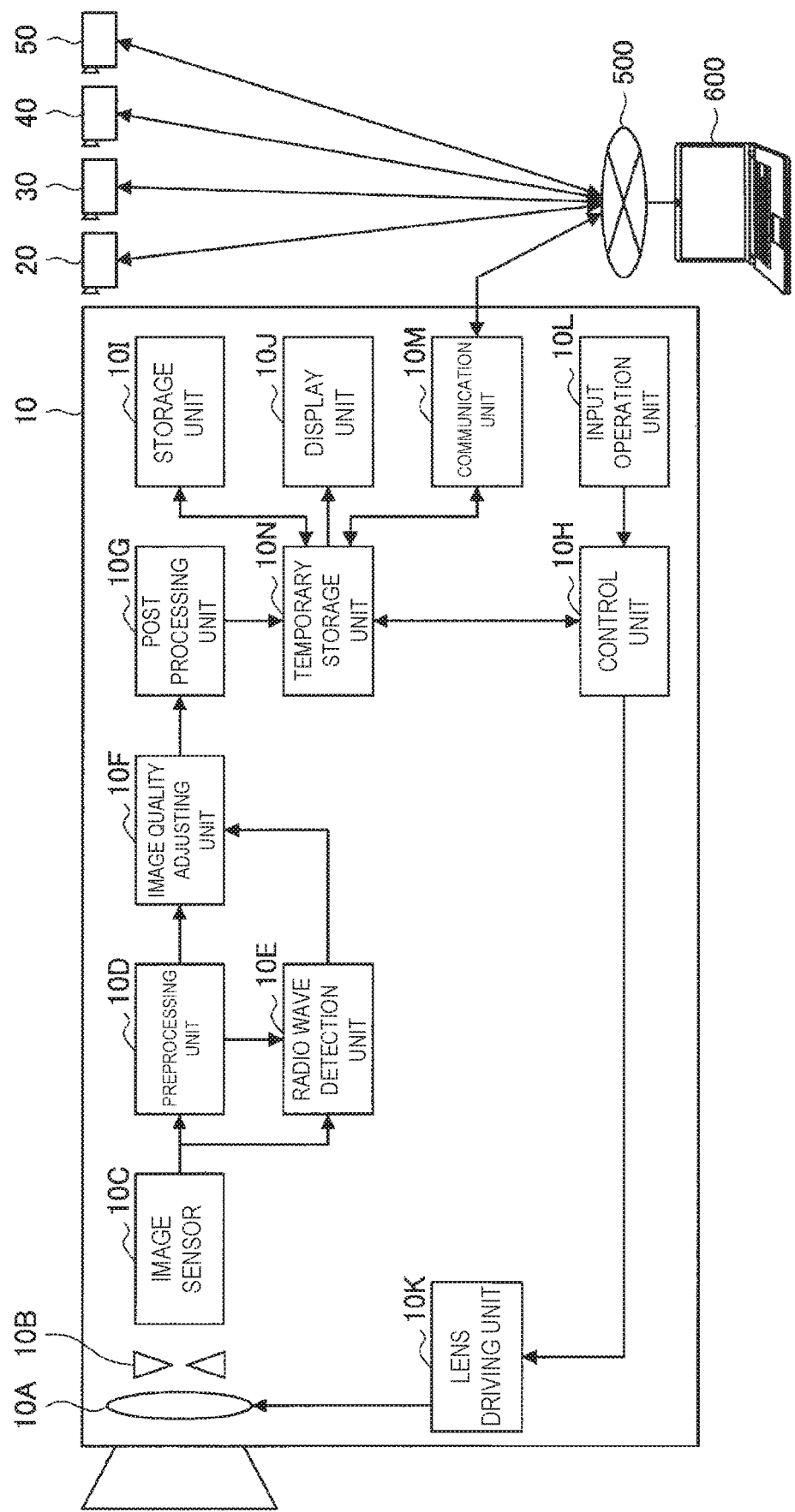
FIG. 16 is a functional block diagram of an imaging device according to the present embodiment.

Next, a configuration of an imaging system according to the present embodiment will be described with reference to FIGS. 16 and 17. The imaging system includes a plurality of imaging devices 10 to 50, an arithmetic device 600, and a network 500 for connecting these devices. Of course, the number of the imaging devices 10 to 50 is not limited thereto, and may be two or more.

Since constituents of the imaging devices 10 to 50 are the same, the constituents of the imaging device 10 will be described herein. The imaging device 10 includes, as shown in FIG. 16, a lens 10A, an aperture 10B, an image sensor 10C, a preprocessing unit 10D, a radio wave detection unit 10E, an image quality adjusting unit 10F, a post processing unit 10G, a control unit 10H, a storage unit 10I, a display unit 10J, a lens driving unit 10K, an input operation unit 10L, a communication unit 10M, and a temporary storage unit 10N.

The lens 10A collects light incident from the outside in the image sensor 10C. The aperture 10B adjusts an amount of light which has passed through the lens 10A. The image sensor 10C generates a captured image according to the light from the lens 10A, and outputs it to the preprocessing unit 10D and the radio wave detection unit 10E. The preprocessing unit 10D is constituted by a circuit such as a central processing unit (CPU), and performs various types of pre-processing on the captured image. Here, the preprocessing is processing for adjusting solid irregularities for each imaging device, and includes, for example, defect correction, shading correction, and the like. The preprocessing unit 10D outputs the pre-processed captured image to the radio wave detection unit 10E and the image quality adjusting unit 10F.

The radio wave detection unit 10E is constituted by a circuit such as a CPU, and acquires radio wave detection information (for example, luminance distribution, and the like) of the captured image by detecting a radio wave of the pre-processed captured image. Then, the radio wave detection unit 10E outputs the radio wave information to the image quality adjusting unit 10F. The image quality adjusting unit 10F is constituted by a circuit such as a CPU, and adjusts image quality of the captured image on the basis of the radio wave information. For example, the image quality adjusting unit 10F adjusts a color, brightness, resolution, a noise sense, a texture, a white balance, and the like of the captured image. The image quality adjusting unit 10F outputs the adjusted captured image to the post processing unit 10G. The post processing unit 10G is constituted by a circuit such as a CPU, and performs various types of post-processing on the captured image. The post processing unit 10G outputs the post-processed captured image to the temporary storage unit 10N.

The temporary storage unit 10N is constituted by a circuit such as a random access memory (RAM), and temporarily stores various types of information used in processing of the imaging device 10. For example, the temporary storage unit 10N stores a captured image given from the post processing unit 10G Information stored in the temporary storage unit 10N is used by each component of the imaging device 10. The details will be described below. The control unit 10H is constituted by a circuit such as a CPU, and performs, for example, the following processing in addition to controlling each component of the imaging device 10. That is, the control unit 10H causes the image sensor 10C to perform imaging on the basis of operation information input from the input operation unit 10L. In addition, the control unit 10H causes the display unit 10J to display a captured image stored in the temporary storage unit 10N, and causes the storage unit 10I to store it. In addition, the control unit 10H generates various adjustment view angle areas on the basis of imaging device information, and superimposes them on the captured image. The control unit 10H outputs the captured image on which the adjustment view angle areas are superimposed to the temporary storage unit 10N. Here, imaging device information is information of an imaging device. Specifically, the imaging device information is, for example, information related to an angle of view of an imaging device. More specifically, the imaging device information includes, for example, information regarding installation positions, postures, focal lengths, and image sensor sizes of the imaging devices 10 to 50. The installation positions and postures of the imaging devices 10 to 50 are calculated by an arithmetic device 600. The focal lengths of the imaging devices 10 to 50 are represented as a so-called camera matrix, and generated by the control units of the imaging devices 10 to 50. The sizes of the image sensors are stored in the storage units of the imaging devices 10 to 50. These pieces of imaging device information are temporarily stored in the temporary storage unit 10N. Then, the control unit 10H generates an adjustment view angle area on the basis of the imaging device information stored in the temporary storage unit 10N. A detailed processing procedure will be described below.

In addition, the control unit 10H controls the lens driving unit 10K on the basis of operation information given from the input operation unit 10L. The lens driving unit 10K adjusts a position of the lens 10A on the basis of an instruction from the control unit 10H. That is, the lens driving unit 10K adjusts a focal length. The control unit 10H causes the temporary storage unit 10N to store an adjusted focal length. In addition, the control unit 10H causes the temporary storage unit 10N to store imaging device information stored in the storage unit 10I, specifically, information regarding the size of the image sensor 10C.

The storage unit 10I is constituted by a circuit such as a read only memory (ROM) or a flash memory, and stores information required for an operation of the imaging device 10 (for example, a program, a focal length, a size of the image sensor 10C, and the like). In addition, the storage unit 10I may also store a captured image (including a captured image on which adjustment view angle areas are superimposed) stored in the temporary storage unit 10N. The display unit 10J superimposes the view angle area 12 of the imaging device 10, the captured image stored in the temporary storage unit 10N and adjustment view angle areas and displays it. The display unit 10J is, for example, a display panel (for example, a liquid crystal display panel, an organic electroluminescence display panel, or the like) disposed on a back surface of the imaging device 10, an electronic view finder (EVF), and the like, but it is not limited thereto.

The lens driving unit 10K is constituted by a lens driving device and the like, and adjusts the position of the lens 10A according to an instruction from the control unit 10H. The input operation unit 10L is constituted by various buttons, a touch panel, and the like, and receives an input operation of a user. Then, the input operation unit 10L outputs operation information to the control unit 10H. The input operation unit 10L is, for example, various buttons (a shutter button, an operation button, and the like), a touch panel, or the like, but it is not limited thereto.

The communication unit 10M is constituted by a communication circuit and the like, and performs communication between other imaging devices 20 to 50 and the arithmetic device 600 via a network 500. For example, the communication unit 10M outputs a captured image stored in the temporary storage unit 10N to the arithmetic device 600. In addition, the communication unit 10M outputs imaging device information (herein, a focal length and an image sensor size of the imaging device 10) stored in the temporary storage unit 10N to the other imaging devices 20 to 50. In addition, the communication unit 10M receives information regarding the focal lengths and the image sensor sizes from the other imaging devices 20 to 50 as imaging device information. In addition, the communication unit 10M receives information regarding the installation positions and postures of the imaging devices 10 to 50 from the arithmetic device 600 as imaging device information. The communication unit 10M outputs the received imaging device information to the temporary storage unit 10N. Note that the imaging device 10 may further include an external storage medium which can be detached from the imaging device 10. The external storage medium may be caused to store a captured image, an adjustment view angle area, and the like.

Note that the imaging devices 10 to 50 include hardware constituents such as a processor such as a central processing unit (CPU) or a digital signal processor (DSP), a read only memory (ROM), a random access memory (RAM), a flash memory, a lens, an aperture, an image sensor, a lens driving device, a display panel (for example, a liquid crystal display panel, an organic electroluminescence display panel, or the like), various types of buttons, a touch panel, and a communication circuit. Then, then, the processor executes signal processing in accordance with a predetermined program, and thereby the functions of the imaging devices 10 to 50 described above are realized. Note that the constituents of the imaging devices 10 to 50 are not limited to the example described above. That is, the imaging devices 10 to 50 may have any constituent as long as the functions of the present embodiment can be realized.

Figure 17:
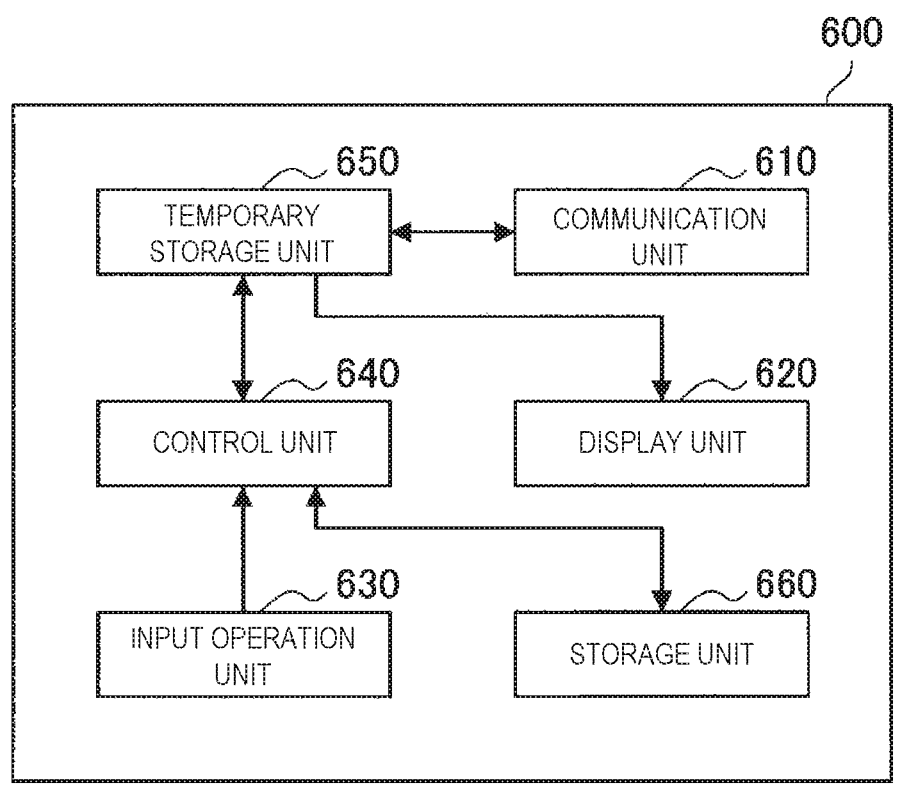
FIG. 17 is a functional block diagram of an arithmetic device according to the present embodiment.

The arithmetic device 600 includes, as shown in FIG. 17, a communication unit 610, a display unit 620, an input operation unit 630, a control unit 640, a temporary storage unit 650, and a storage unit 660. The communication unit 610 is constituted by a communication circuit, and the like, and performs communication with the imaging devices 10 to 50 via the network 500. Specifically, the communication unit 610 receives captured images from the imaging devices 10 to 50, and outputs them to the temporary storage unit 650. In addition, the communication unit 610 outputs imaging device information (specifically, the installation positions and postures of the imaging devices 10 to 50) stored in the temporary storage unit 650 to the imaging devices 10 to 50. The display unit 620 is constituted by a display panel (for example, a liquid crystal display panel, an organic electroluminescence display panel, or the like), and displays various types of information stored in the temporary storage unit 650. The input operation unit 630 is, for example, a mouse, a keyboard, a touch panel, or the like, and receives an input operation of a user. The input operation unit 630 outputs operation information to the control unit 640. The control unit 640 is constituted by a circuit such as a CPU, and performs the following processing in addition to controlling each component of the arithmetic device 600. The control unit 640 calculates (estimates) the installation positions and postures of the imaging devices 10 to 50 on the basis of a captured image stored in the temporary storage unit 650. In brief, the control unit 640 extracts a subject from a captured image, and calculates the installation positions and postures of the imaging devices 10 to 50 on the basis of the size, rotation angle, and the like of the subject. Here, the control unit 640 calculates the installation positions of the imaging devices 10 to 50 in a form of a position vector, and calculates the postures of the imaging devices 10 to 50 in a form of a rotation matrix. The control unit 640 outputs imaging device information regarding the installation positions and postures of the imaging devices 10 to 50 to the temporary storage unit 650. The temporary storage unit 650 is constituted by a circuit such as a random access memory (RAM), and temporarily stores various types of information used in processing of the arithmetic device 600. For example, the temporary storage unit 650, as described above, stores a captured image given from the communication unit 610. The information stored in the temporary storage unit 650 is used by each component of the arithmetic device 600. The storage unit 660 is constituted by a circuit such as a read only memory (ROM), and stores information (for example, a program, and the like) required for an operation of the arithmetic device 600.

Note that the arithmetic device 600 includes hardware constituents such as a processor such as a central processing unit (CPU) or a digital signal processor (DSP), a read only memory (ROM), a random access memory (RAM), a hard disk, a display panel (for example, a liquid crystal display panel, an organic electroluminescence display panel, or the like), a keyboard, a mouse, a touch panel, and a communication circuit. Then, then, the processor executes signal processing in accordance with a predetermined program, and thereby the functions of the arithmetic device 600 described above are realized. Note that the constituents of the arithmetic device 600 are not limited to the example described above. That is, the arithmetic device 600 may have any constituent as long as the functions of the present embodiment can be realized. For example, the arithmetic device 600 may not have at least one type of the display unit 620 or the input operation unit 630 described above. Moreover, an operation of the control unit 640 may be caused to be performed by one of the control units of the imaging devices 10 to 50. In this case, there is no need to separately prepare the arithmetic device 600.

<4. Processing Example of Imaging System>

Figure 18:
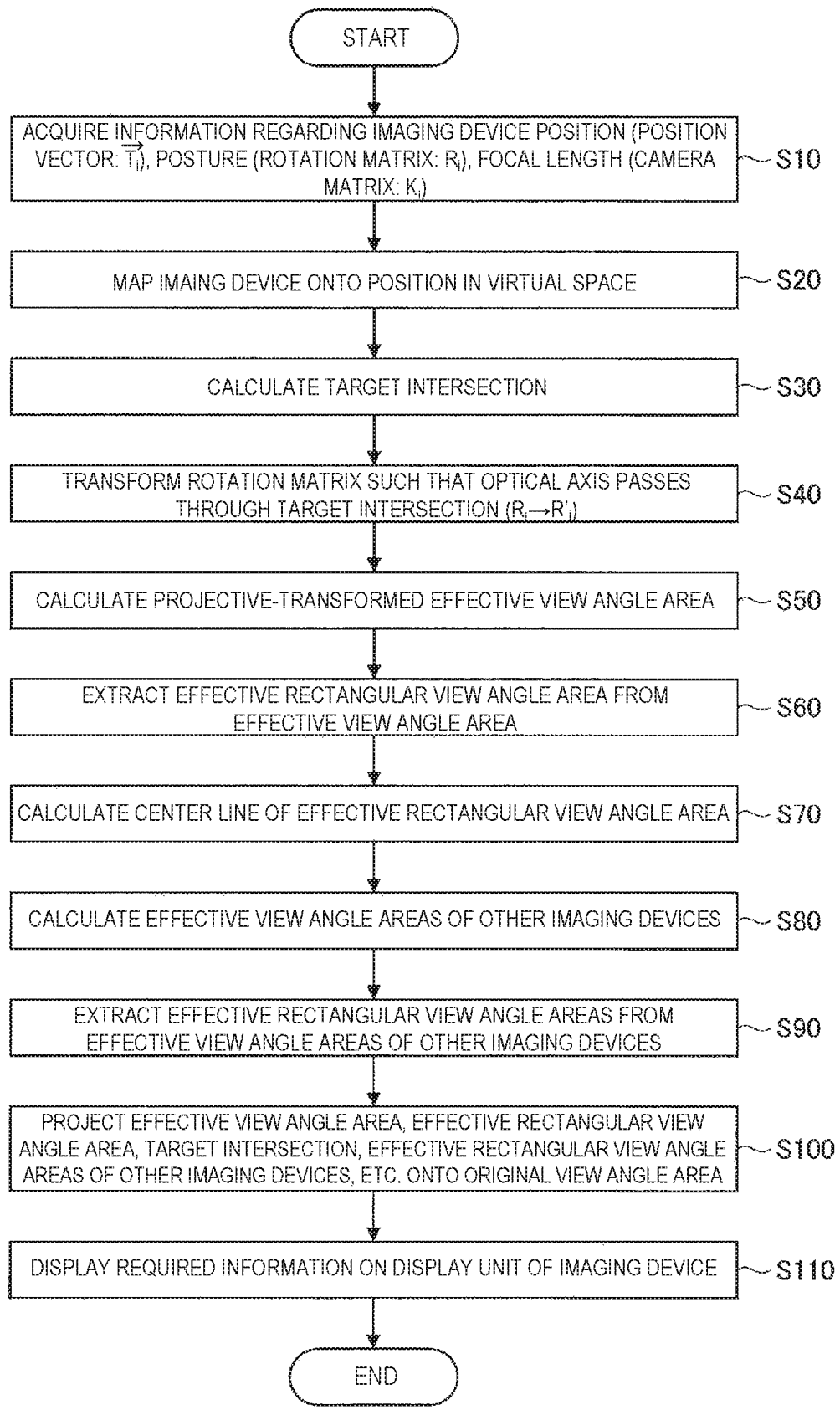
FIG. 18 is a flowchart which shows a processing procedure of an imaging system according to the present embodiment.
Figure 19:
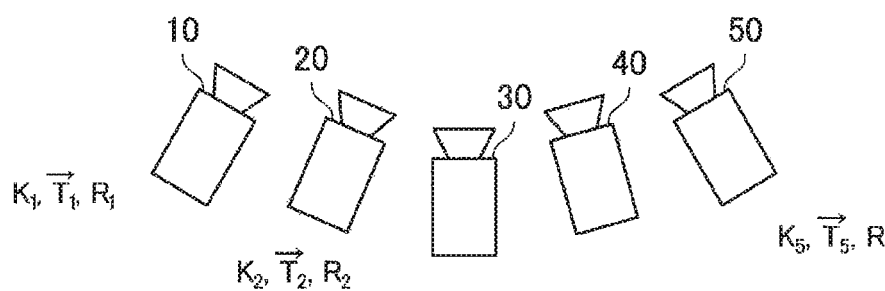
FIG. 19 is an explanatory view for describing a processing example of the imaging system according to the present embodiment.

Next, a processing example of an imaging system will be described with reference to a flowchart shown in FIG. 18. Note that processing in a case in which imaging is performed by the imaging devices 10 to 50 will be described as shown in FIG. 19 in the following processing example. In addition, an example in which the imaging device 10 generates an adjustment view angle area will be described in the following processing example, but other imaging devices 20 to 50 can also generate adjustment view angle areas according to the same processing. Note that a subscript i in FIG. 18 is an integer from 1 to 5, and corresponds to the imaging devices 10 to 50. In addition, the following processing example is performed at any time.

In step S10, the imaging devices 10 to 50 transmit captured images to the arithmetic device 600. Specifically, the communication units of the imaging devices 10 to 50 transmit captured images stored in the temporary storage unit to the arithmetic device 600. Accordingly, the communication unit 610 of the arithmetic device 600 outputs these captured images to the temporary storage unit 650. The control unit 640 generates imaging device information regarding the installation positions and postures of the imaging devices 10 to 50 on the basis of the captured images stored in the temporary storage unit 650. Then, the control unit 640 outputs these pieces of imaging device information to the temporary storage unit 650. Next, the communication unit 610 transmits the imaging device information stored in the temporary storage unit 650 to the imaging devices 10 to 50. In addition, the imaging devices 10 to 50 exchange pieces of imaging device information regarding the focal lengths and the image sensor sizes with each other. For example, the control unit 10H acquires imaging device information regarding the focal length and the image sensor size of the imaging device 10 from the storage unit 10I, and outputs the information to the temporary storage unit 10N. The communication unit 10M transmits imaging device information stored in the temporary storage unit 10N to other imaging devices 20 to 50. In addition, the communication unit 10M acquires imaging device information regarding focal lengths and image sensor sizes from the other imaging devices 20 to 50. The communication unit 10M outputs these pieces of imaging device information to the temporary storage unit 10N.

According to the above processing, imaging device information regarding the installation positions, postures, focal lengths, and image sensor sizes of the imaging devices 10 to 50 is stored in the temporary storage unit 10N of the imaging device 10. The installation positions are given in the form of a position vector, the postures are given in the form of rotation matrix, and the focal lengths are given in the form of a camera matrix.

Figure 20:
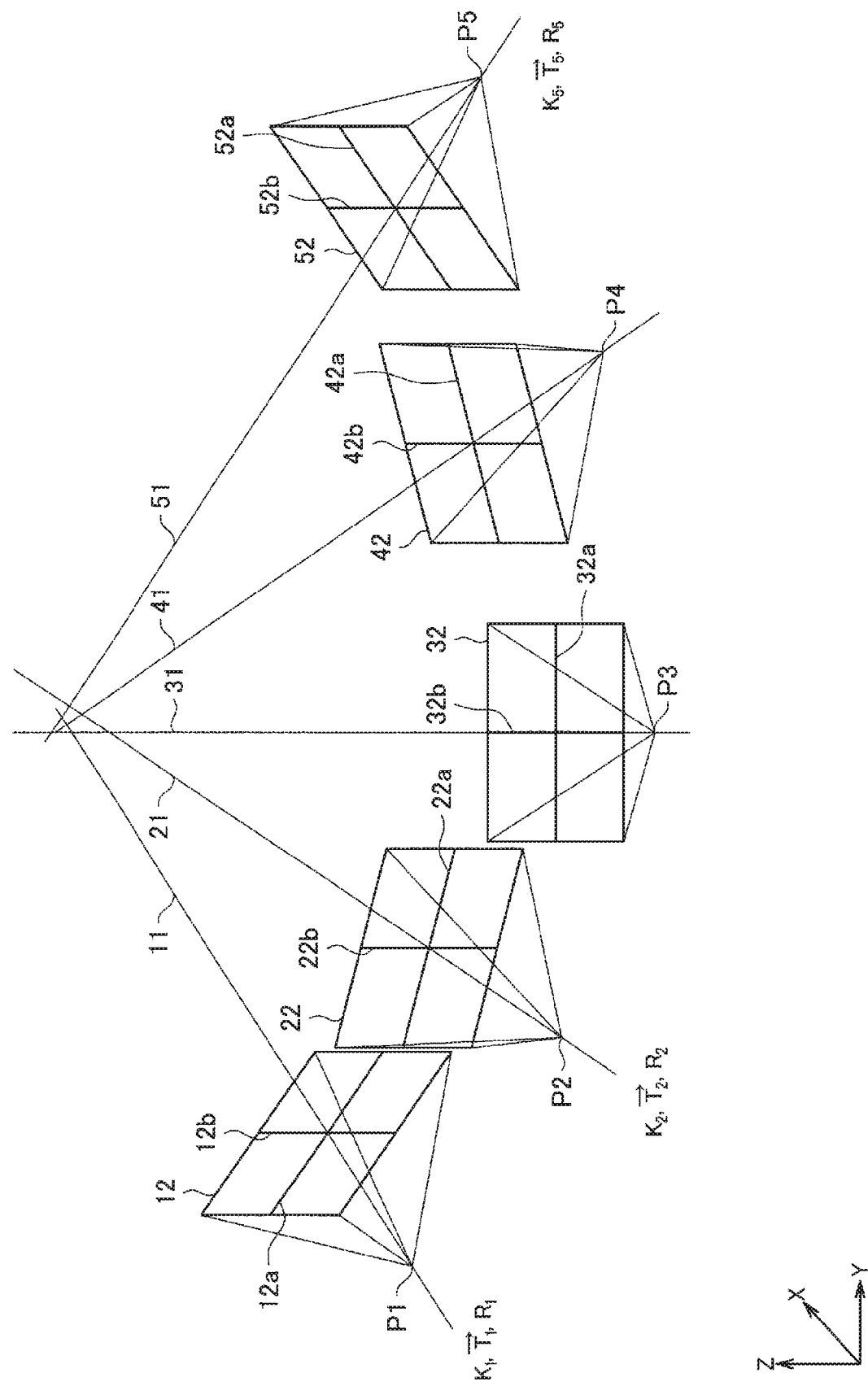
FIG. 20 is an explanatory view for describing a processing example of the imaging system according to the present embodiment.

In step S20, the control unit 10H sets a three dimensional virtual space. Then, the control unit 10H installs the imaging devices 10 to 50 at points P1 to P5 within a virtual space on the basis of the position vectors of the imaging devices 10 to 50 as shown in FIG. 20. Coordinates of the points P1 to P5 are determined by the position vectors. Furthermore, the control unit 10H determines the postures of the imaging devices 10 to 50 on the basis of the rotation matrixes. Then, the control unit 10H sets optical axes 11 to 51 of the imaging devices 10 to 50. Moreover, the control unit 10H sets view angle areas 12 to 52 on the optical axes 11 to 51 on the basis of a camera matrix and an image sensor size. Furthermore, the control unit 10H sets center lines 12a to 52a of the horizontal view angle direction and center lines 12b to 52b of the vertical view angle direction on the view angle areas 12 to 52. In addition, the control unit 10H sets a xy plane on the view angle areas 12 to 52.

Figure 21:
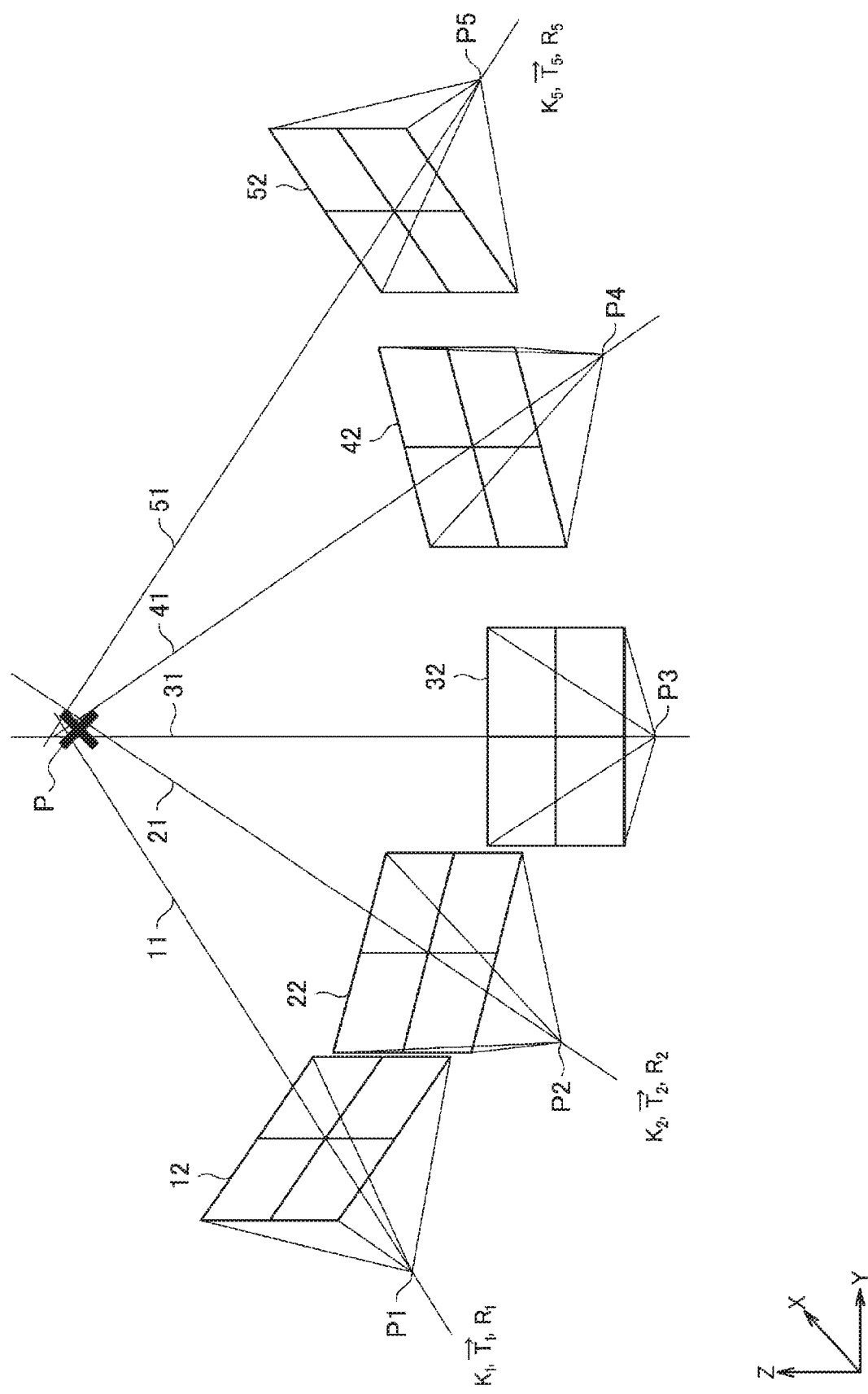
FIG. 21 is an explanatory view for describing a processing example of the imaging system according to the present embodiment.

In processing from step S30, the control unit 10H transforms at least one of the view angle areas 12 to 52, and sets a transformed view angle area into an adjustment view angle area. Specifically, the control unit 10H, as shown in FIG. 21, sets a target intersection P of the optical axes 11 to 51 on the basis of the optical axes 11 to 51 in step S30. For example, the control unit 10H sets a closest point of the optical axes 11 to 51 as the target intersection P.

Figure 22:
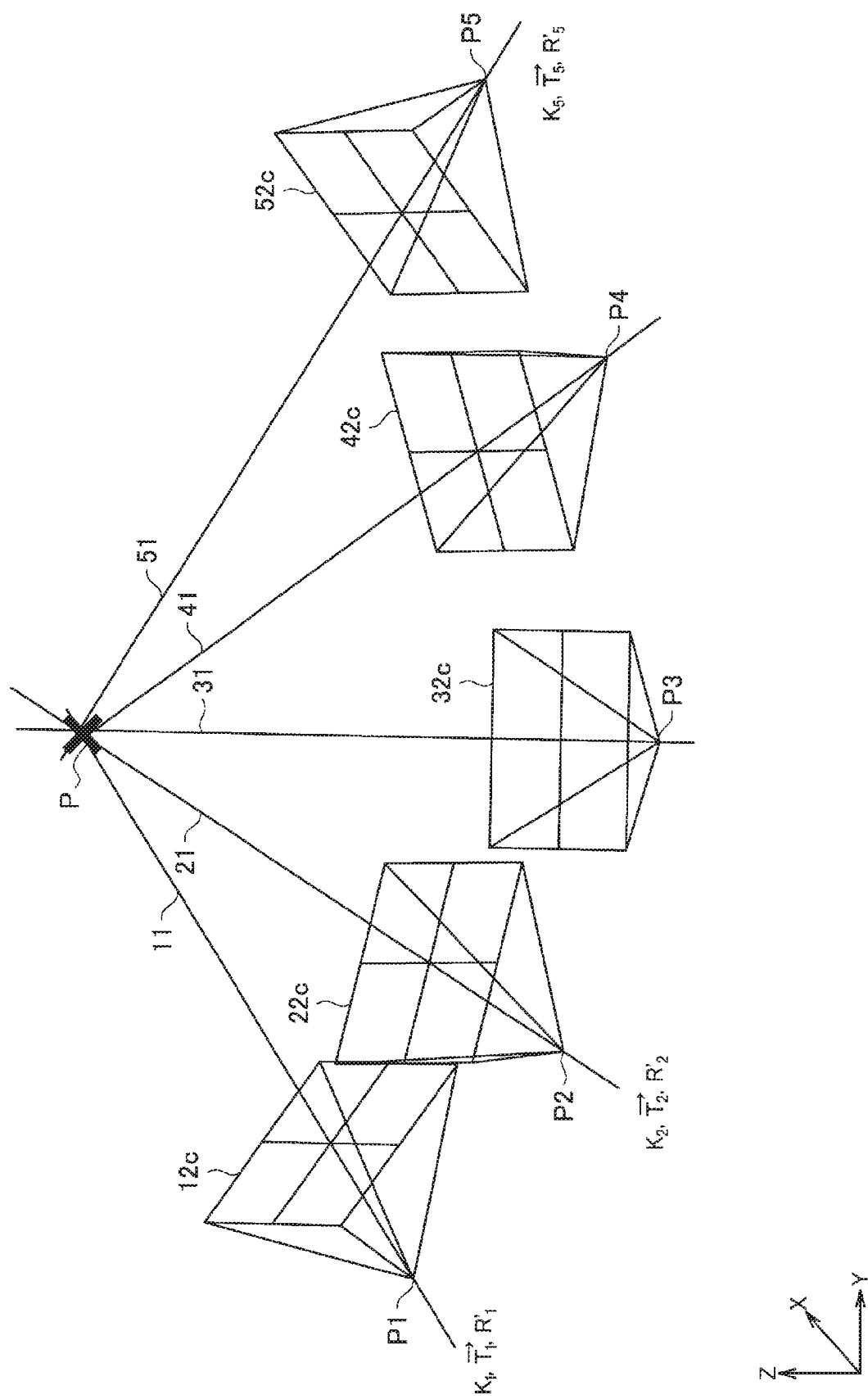
FIG. 22 is an explanatory view for describing a processing example of the imaging system according to the present embodiment.

In step S40, the control unit 10H transforms at least one of the view angle areas 12 to 52 on the basis of the target intersection P. Specifically, the control unit 10H, as shown in FIG. 22, corrects the postures of the imaging devices 10 to 50 such that all the optical axes 11 to 51 are directed to the target intersection point P. Specifically, the control unit 10H transforms the rotation matrixes of the imaging devices 10 to 50 ($R_i \rightarrow R'_i$). That is, the control unit 10H adjusts the imaging device information. Then, the control unit 10H newly sets view angle areas 12c to 52c corresponding to the corrected postures.

Figure 23:
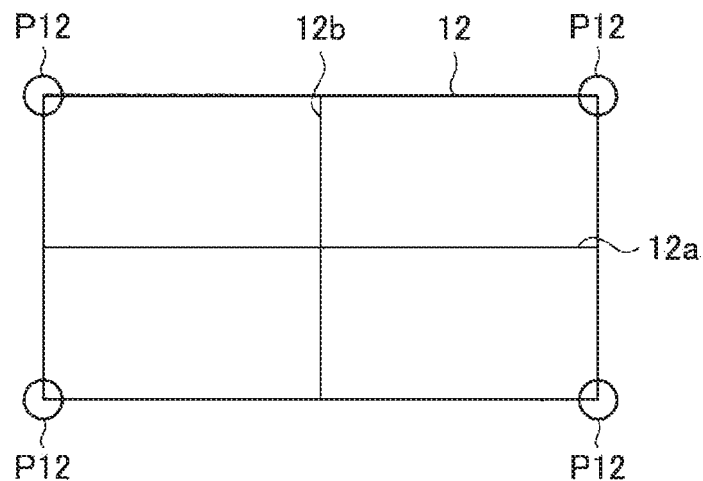
FIG. 23 is an explanatory view for describing a processing example of the imaging system according to the present embodiment.

Then, the control unit 10H performs projective transformation on the view angle area 12 in step S50. Specifically, the control unit 10H, as shown in FIG. 23, performs projective transformation on vertexes P12 at four corners of the view angle area 12 by a homography matrix $H_1$. Here, the homography matrix $H_1$ is a matrix denoted by $K_1 R'_1 K_1^{-1}$. Here, $K_1$ is a camera matrix of the imaging device 10, $R'_1$ is a transformed rotation matrix of the imaging device 10, and $K_1^{-1}$ is an inverse matrix of the camera matrix of the imaging device 10.

Figure 24:
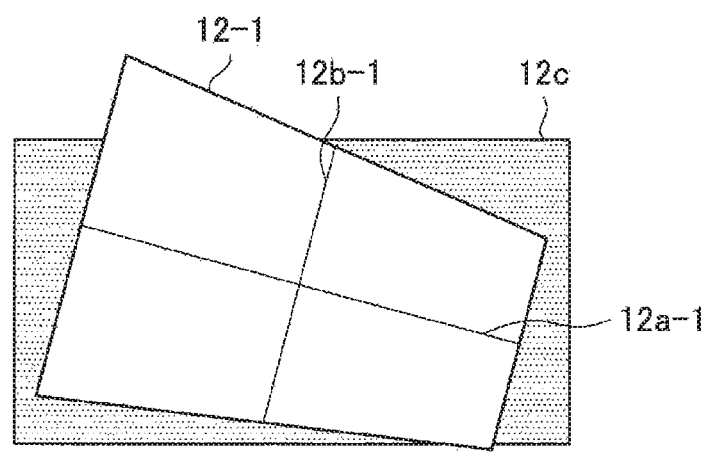
FIG. 24 is an explanatory view for describing a processing example of the imaging system according to the present embodiment.
Figure 25:
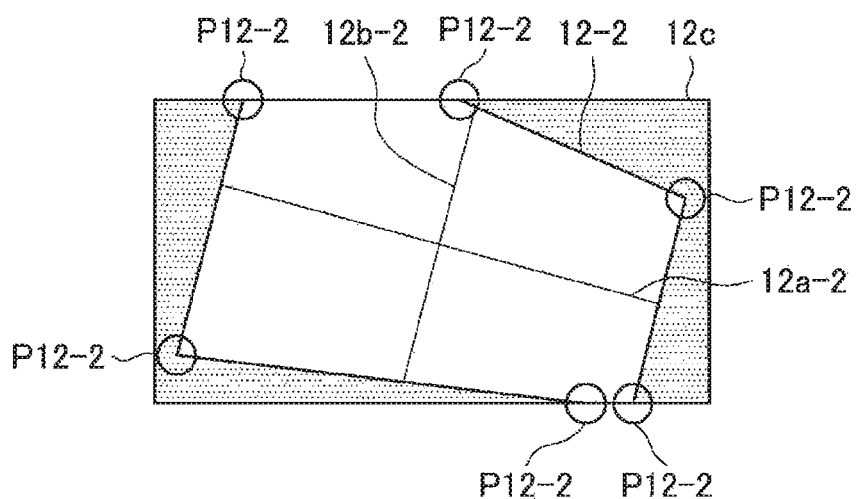
FIG. 25 is an explanatory view for describing a processing example of the imaging system according to the present embodiment.

Then, the control unit 10H superimposes the projective-transformed view angle area 12-1 on a new view angle area 12c as shown in FIG. 24. A center line 12a-1 of the horizontal view angle direction and a center line 12b-1 of the vertical view angle direction are shown in the view angle area 12-1. As is apparent from FIG. 24, the view angle area 12-1 does not coincide with the view angle area 12c. For example, a part of the view angle area 12-1 protrudes from the view angle area 12c. Of the view angle area 12-1, an area protruding from the view angle area 12c is not imaged. Therefore, the control unit 10H sets an area existing in the view angle area 12c among the view angle area 12-1 as an effective view angle area 12-2. Then, the control unit 10H extracts a vertex P12-2 of the effective view angle area 12-2.

Figure 26:
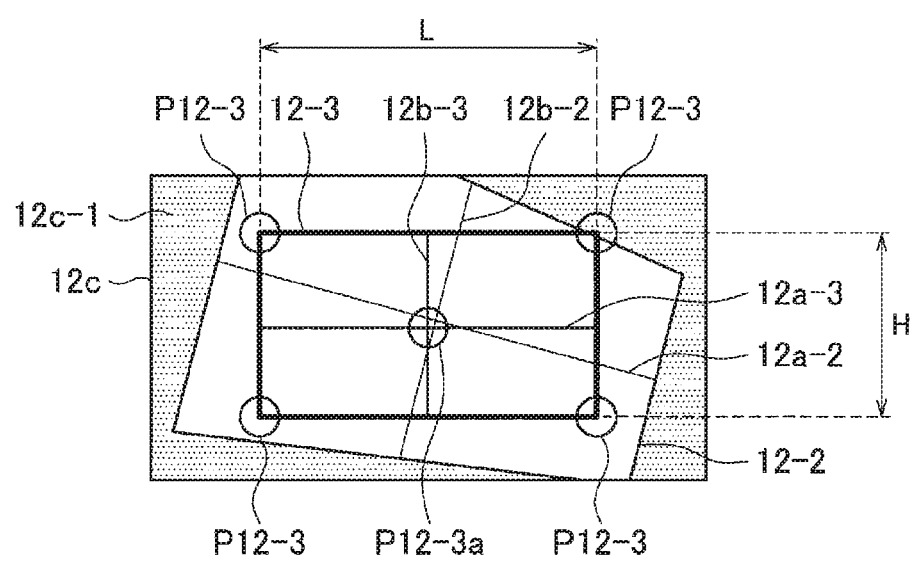
FIG. 26 is an explanatory view for describing a processing example of the imaging system according to the present embodiment.

In step S60, the control unit 10H extracts an effective rectangular view angle area 12-3 from the effective view angle area 12-2 as shown in FIG. 26. In the view angle area 12c, there is an area 12c-1 in which there is no effective view angle area 12-2. Therefore, in a case in which all images in the view angle area 12c are displayed as output images, the area 12c-1 will also be displayed. This area 12c-1 is, for example, displayed as a black image. This gives a viewer much discomfort. Therefore, the effective rectangular view angle area 12-3 is extracted from the effective view angle area 12-2 such that there is no black image existing above, below, to the right or left of an output image. Specifically, the control unit 10H extracts vertexes P12-3 at four corners of the effective rectangular view angle area 12-3. It is preferable that an aspect ratio of the effective rectangular view angle area 12-3 coincide with an aspect ratio of the view angle area 12c. In addition, it is preferable that a center point (a center of gravity point) P12-3a of the effective rectangular view angle area 12-3 coincides with a center point (a center of gravity point) of the view angle area 12c.

In step S70, the control unit 10H sets a center line 12a-3 of the horizontal view angle direction of the effective rectangular view angle area 12-3 and a center line 12b-3 of the vertical view angle direction, and calculates these lengths L and H.

In step S80, the control unit 10H calculates the effective view angle areas and effective rectangular view angle areas of the other imaging devices 20 to 50. A specific calculation method is the same as the step S50 described above.

In step S90, the control unit 10H extracts the effective rectangular view angle areas from the effective view angle areas of the other imaging devices 20 to 50. Furthermore, the control unit 10H sets a center line of the horizontal view angle direction of the effective rectangular view angle areas and a center line of the vertical view angle direction, and calculates these lengths L and H.

In step S100, the control unit 10H projects the effective view angle area and the effective rectangular view angle area of the imaging device 10 onto an original view angle area 12. Specifically, the control unit 10H transforms the vertex P12-2 of the effective view angle area 12-2 of the imaging device 10 and the vertex P12-3 of the effective rectangular view angle area 12-3 using an inverse matrix $H_1^{-1}$ of the homography matrix. Then, the control unit 10H projects the view angle areas 22c to 52c, effective view angle area, and effective rectangular view angle area of the other imaging devices 20 to 50 onto the view angle area 12 of the imaging device 10.

Hereinafter, a method of projecting the view angle area 22c, effective view angle area, and effective rectangular view angle area of the imaging device 20 onto the view angle area 12 will be described. It is possible to project the view angle areas 32c to 52c, effective view angle areas, and effective rectangular view angle areas of the other imaging devices 30 to 50 onto the view angle area 12 in the same manner.

Figure 27:
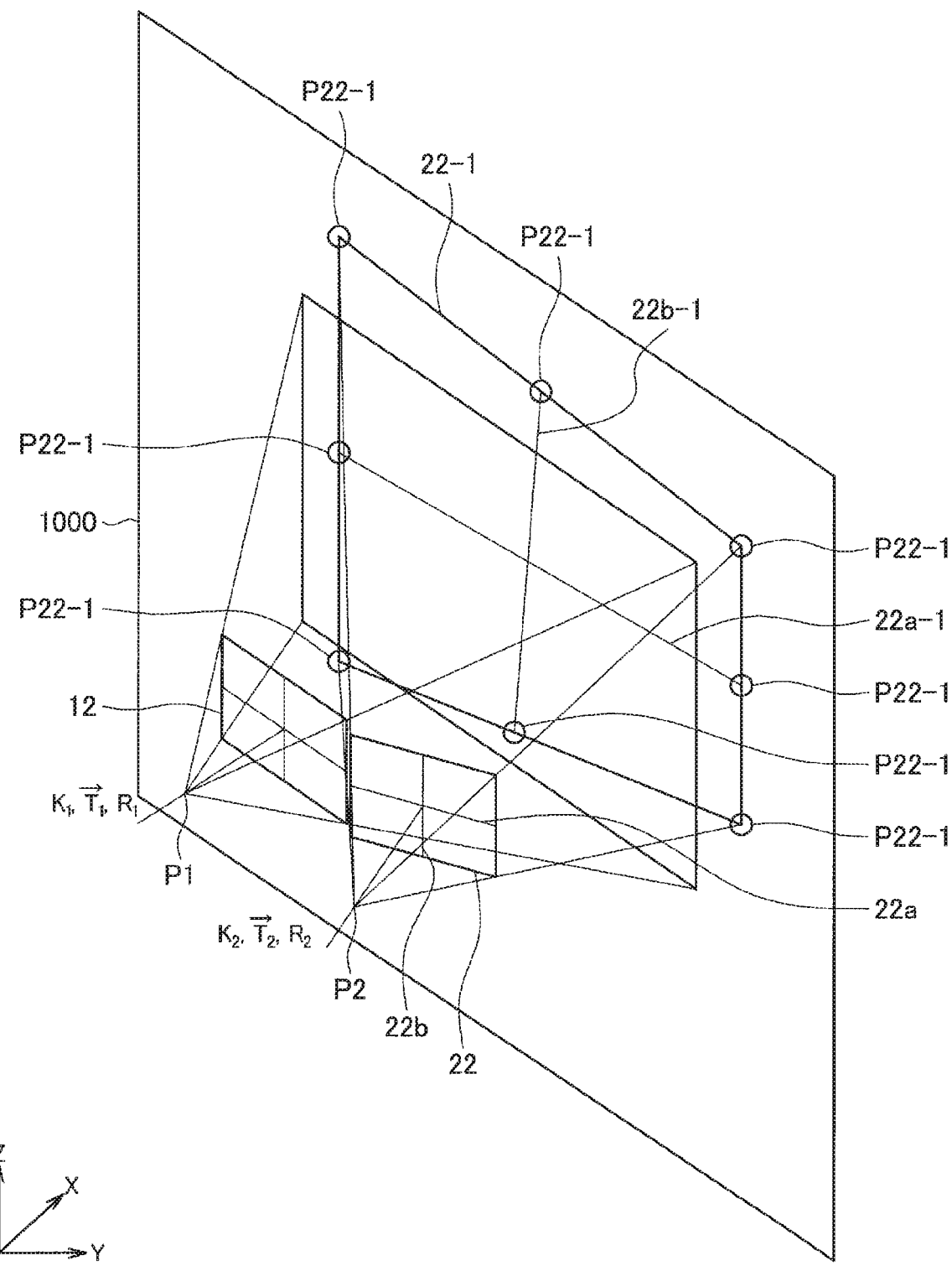
FIG. 27 is an explanatory view for describing a processing example of the imaging system according to the present embodiment.

In this method, the view angle area 22c, and the like of the imaging device 20 are projected onto the view angle area 12c in terms of how the view angle area 22c and the like of the imaging device 20 are imaged on the view angle area 12c. Specifically, as shown in FIG. 27, the control unit 10H sets a plane 1000 parallel to the view angle area 12c at a position sufficiently away from the point P1. Then, the control unit 10H sets points P22-1 corresponding to eight points of the view angle area 22c (specifically, the vertexes at four corners, four intersection points of each center line and a frame line) on the plane 1000. These points 22-1 are intersection points of a straight line connecting a point P2 and the eight points of the view angle area 22c and the plane 1000. Using these points P22-1, a distant view angle area 22-1 is formed on the plane 1000. The distance view angle area 22-1 includes a center line 22a-1 of the horizontal view angle direction and a center line 22b-1 of the vertical view angle direction.

Then, the control unit 10H projects each point P22-1 of the distance view angle area 22-1 on the view angle area 12 on the basis of the following Equation (1).

[Math. 1]

$$s \begin{pmatrix} u \\ v \\ 1 \end{pmatrix}_t = K_1 (R_1 | T_1) \begin{pmatrix} x_w \\ y_w \\ z_w \\ 1 \end{pmatrix}_w \quad (1)$$

Figure 28:
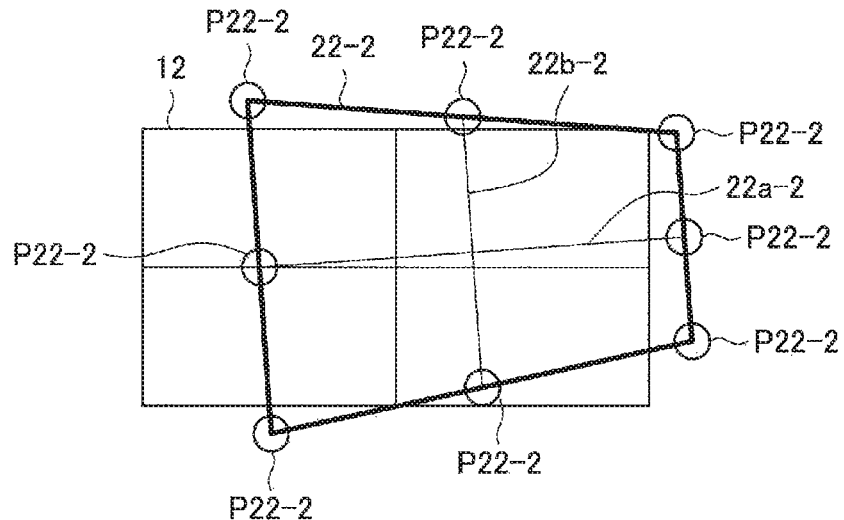
FIG. 28 is an explanatory view for describing a processing example of the imaging system according to the present embodiment.

In Equation (1), u and v are two-dimensional coordinates on a xy plane defined on the view angle area 12c, and $x_w$, $y_w$, and $z_w$ are three-dimensional coordinates of the point P22-1 in the virtual space. A view angle area 22-2 shown in FIG. 28 indicates the view angle area 22 projected onto the view angle area 12. The point P22-2 corresponds to the point P22-1. In addition, a center line 22a-2 of the horizontal view angle direction corresponds to the center line 22a-1, and a center line 22b-2 of the vertical view angle direction corresponds to the center line 22b-1. Note that the whole view angle area 22-2 is shown in FIG. 28, but a portion within a range of the view angle area 12 is actually displayed.

Figure 29:
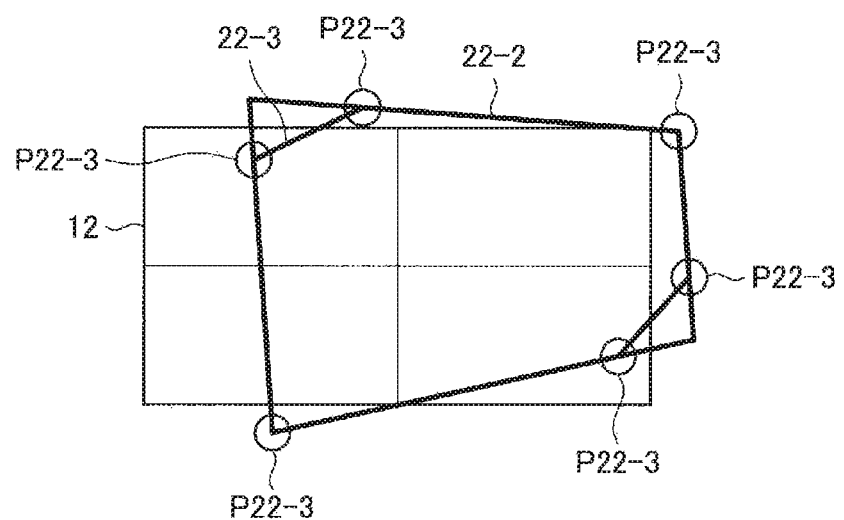
FIG. 29 is an explanatory view for describing a processing example of the imaging system according to the present embodiment.

The control unit 10H also projects the effective view angle area and effective rectangular view angle area of the imaging device 20 onto the view angle area 12 in the same method. A view angle area 22-3 shown in FIG. 29 is the effective view angle area of the imaging device 20 projected onto the view angle area 12. A point P22-3 is a vertex of the effective view angle area. Note that the whole view angle area 22-3 is shown in FIG. 29, but a portion within the range of the view angle area 12 is actually displayed.

Figure 30:
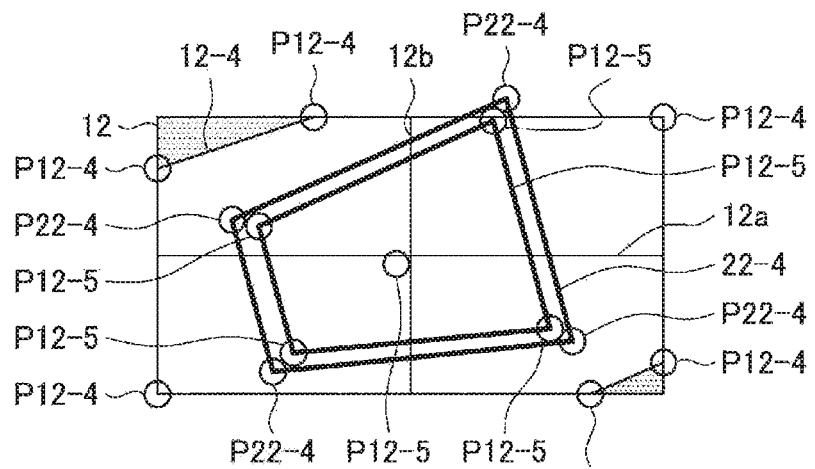
FIG. 30 is an explanatory view for describing a processing example of the imaging system according to the present embodiment.

As a result of the above, the control unit 10H obtains, for example, a superimpose view angle area shown in FIG. 30. In this superimposed view angle area, view angle areas 12-4, 12-5, and 22-4 are superimposed onto the view angle area 12. The view angle area 12-4 is the effective view angle area 12-2 of the imaging device 10 projected onto the view angle area 12. A point P12-4 corresponds to a vertex P12-2 of the effective view angle area 12-2. A view angle area 12-5 is the effective rectangular view angle area 12-3 of the imaging device 10 projected onto the view angle area 12. A view angle area 22-4 is the effective rectangular view angle area of the imaging device 20 projected onto the view angle area 12. Center points P12-5 and P22-4 are center points of the view angle areas 12-5 and 22-4. Note that the view angle areas 22-2 and 22-3 are omitted in FIG. 30. In addition, a center line of the horizontal view angle direction and a center line of the vertical view angle direction of the view angle areas other than the view angle area 12 are omitted.

Furthermore, the control unit 10H also projects the target intersection P onto the view angle area 12 in the same method as described above.

In step S110, the control unit 10H outputs a generated superimposed view angle area to the temporary storage unit 10N. Furthermore, the control unit 10H displays a required view angle area among superimposed view angle areas stored in the temporary storage unit 10N on the display unit 10J. The control unit 10H may display all the view angle areas, and may also display a view angle area selected by a user. In addition, view angle areas not selected by a user may not be subjected to the transformation processing described above. Moreover, in the processing example described above, the postures of the imaging devices 10 to 50 are corrected such that the optical axes 11 to 51 are directed to the target intersection P, but it is possible to superimpose the view angle areas 22 to 52 of the other imaging devices 20 to 50 onto the view angle area 12 of the imaging device 10 without performing such correction. A specific display example will be described below.

<5. Image Example Displayed on Imaging Device>

(5-1. Image Example 1 Displayed on Imaging Device)

Figure 31:
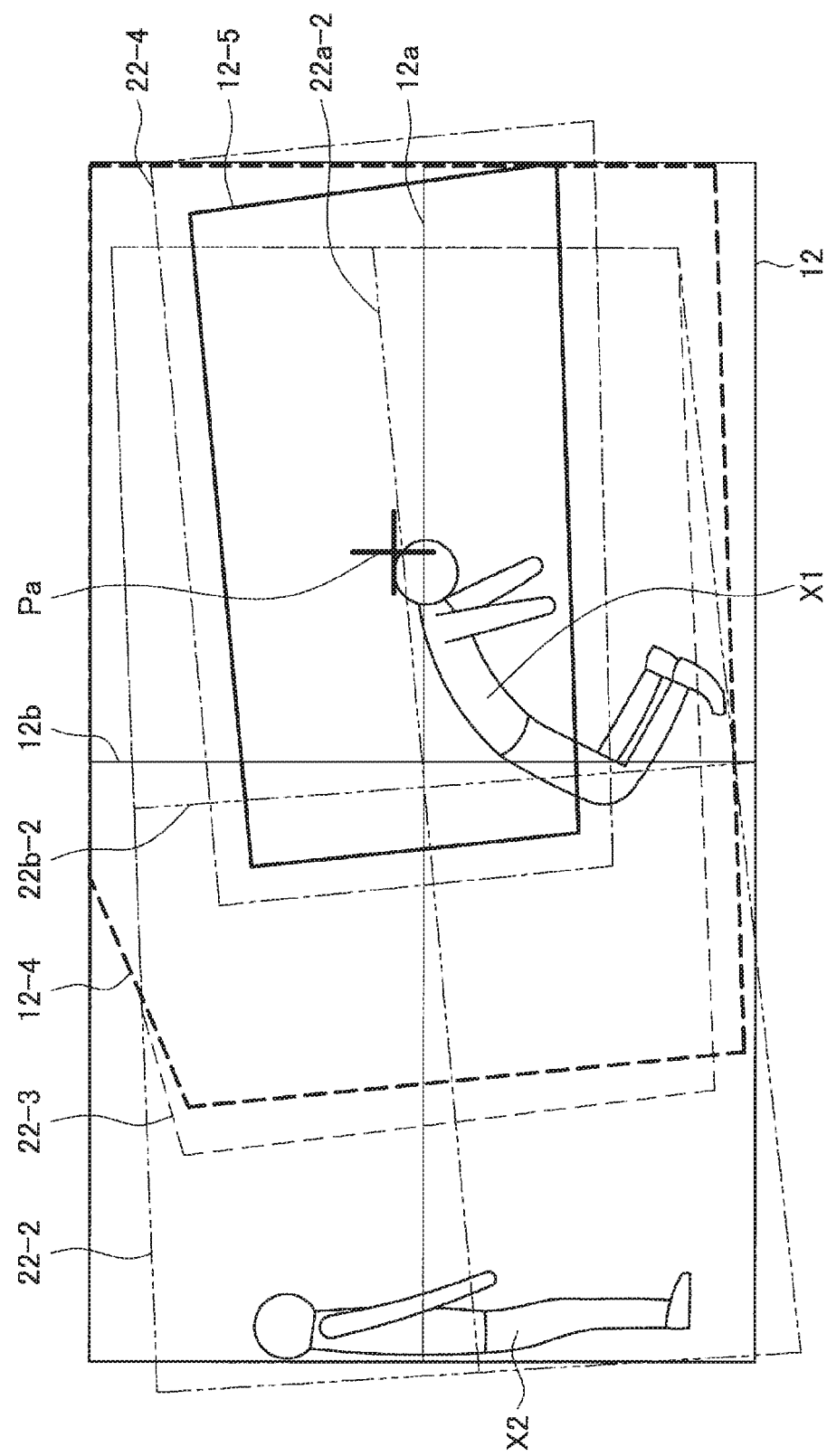
FIG. 31 is an explanatory view which shows an example of an image displayed on a display unit of each imaging device according to the present embodiment.

Next, an example of an image displayed on the imaging device 10 and the like will be described. FIG. 31 shows an image example 1. In this image example 1, subjects X1 and X2 are imaged by the imaging devices 10 to 50. Then, an image of the image example 1 is displayed on the display unit 10J of the imaging device 10. Specifically, subjects X1 and X2, and the view angle area 12 of the imaging device 10 are displayed on the display unit 10J of the imaging device 10. In addition, the center line 12a of the horizontal view angle direction and the center line 12b of the vertical view angle direction are displayed in the view angle area 12 as an example of characteristic information of the view angle area 12. Furthermore, the view angle areas 12-4, 12-5, 22-2, 22-3, and 22-4 are superimposed onto the view angle area 12 and displayed on the display unit 10J. Definitions of these view angle areas 12-4, 12-5, 22-2, 22-3, and 22-4 are as described above. Furthermore, the center line 22a-2 of the horizontal view angle direction and the center line 22b-2 of the vertical view angle direction of the view angle area 22-2 are also displayed on the display unit 10J as characteristic information of the view angle area 22-2. Note that although a portion outside a frame of the view angle area 12 is also shown in FIG. 31, the portion outside the frame of the view angle area 12 is not displayed on the display unit 10J. In addition, the control unit 10H changes a line type (for example, a color, a thickness, the presence or absence of flickering, or the like) for each view angle area, and displays it. The same also applies to other image examples below:

Furthermore, a target intersection Pa is also displayed on the display unit 10J. This target intersection Pa is a target intersection P projected onto the view angle area 12. Note that the target intersection P is set in consideration of other imaging devices 30 to 50 in this example, and thus a position of the target intersection P deviates from an intersection of the optical axes of the imaging devices 10 and 20.

Note that characteristic information of the view angle areas 12 and 22-2 may also be other pieces of information, for example, a center point of the view angle areas 12 and 22-2. In addition, as a form of indicating a view angle area, for example, only a vertex of the view angle area may be displayed. That is, any form of displaying a view angle area may be adopted. In addition, the view angle areas of other imaging devices 30 to 50 may also be displayed. Moreover, for example, if a user's purpose is to match the optical axis 11 with the intersection P, the view angle areas 22-2, 22-3, and 22-4 of the imaging device 20 may be omitted. On the contrary, in a case in which a user's purpose is to adjust the view angle area 12 on the basis of the view angle areas of other imaging devices 20 to 50, the view angle areas 12-4 and 12-5 may be omitted. Such a case includes, for example, a case in which the size of the view angle area 12 is aligned with the size of the view angle areas of the other imaging devices 20 to 50.

According to this image example 1, a user can intuitively and easily ascertain that a center point of the view angle area 12 of the imaging device 10, that is, the optical axis 11 of the imaging device 10, deviates from the target intersection Pa. Furthermore, a user can also intuitively and easily ascertain that the view angle areas 12-4 and 12-5 deviate from the view angle area 12. For this reason, a user can ascertain that, as it is, image processing similar to "imaging example 1 not as intended by a user" is necessary. Specifically, a user can easily ascertain that a portion of the view angle area 12 not included in the view angle area 12-5 is an area which cannot be used. More specifically, in a case in which a captured image is corrected to a captured image imaged in a new view angle area 12c, a user can recognize that an area in which there is no captured image occurs. Then, a user can ascertain that there is a need to extract the view angle area 12-5 from the captured image such that such an area does not occur. Therefore, the user adjusts the posture of the imaging device 10 such that the center point of the view angle area 12 coincides with the target intersection Pa. Since processing of the processing example described above is performed at any time, if a user moves the imaging device 10, an image displayed on the display unit 10J according to the movement is changed at any time. In a case in which the center point of the view angle area 12 coincides with the target intersection Pa, the view angle areas 12-4 and 12-5 also substantially coincide with the view angle area 12.

Incidentally, as in the image example 1, the effective view angle area and the effective rectangular view angle area are smaller than the view angle area because at least one of the optical axes 11 to 51 of the imaging devices 10 to 50 deviates from the target intersection P. As shown in the image example 1, not only the effective view angle area and the effective rectangular view angle area of the imaging device 10 but also the effective view angle area and the effective rectangular view angle area of another imaging device 20 are displayed on the display unit 10J of the imaging device 10, and thereby it is possible to easily ascertain which imaging device has a problem.

Furthermore, a user can ascertain that the size of the view angle area 12 is different from the size of the view angle area 22-2. In this case, it is considered that the focal length of the imaging device 10 does not match the focal length of the imaging device 20. Therefore, the user can adjust the focal length such that the size of the view angle area 12 substantially coincides with the size of the view angle area 22-2. Furthermore, the user can ascertain that the horizontal view angle direction of the view angle area 12 deviates from the horizontal view angle direction of the view angle area 22. For this reason, the user can cause the horizontal view angle direction of the view angle area 12 to coincide with the horizontal vie angle direction of the view angle area 22 by adjusting the posture of the imaging device 10 (causing the imaging device 10 to rotate around the optical axis 11). Therefore, the user can adjust the view angle area 12 more intuitively and easily.

In addition, in the image example 1, a user can easily ascertain that the view angle area 22-2 deviates from the view angle areas 22-3 and 22-4. Therefore, the user can ascertain intuitively and easily that the optical axis 21 of the imaging device 20 also deviates from the target intersection P.

(5-2. Image Example 2 Displayed on Imaging Device)

Figure 32:
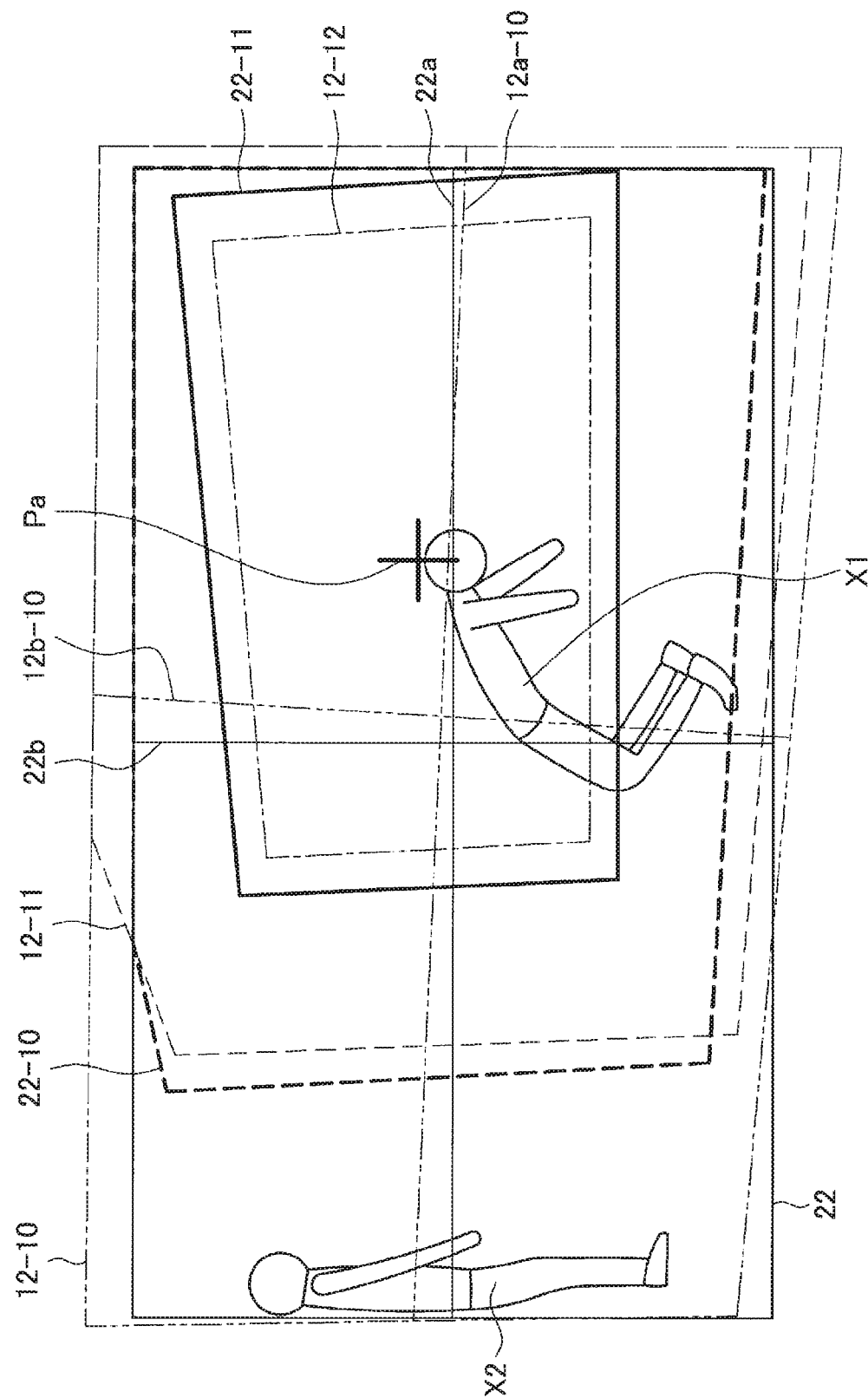
FIG. 32 is an explanatory view which shows an example of an image displayed on a display unit of each imaging device according to the present embodiment.

FIG. 32 shows an image example 2. In this image example 2, the subjects X1 and X2 are imaged by the imaging devices 10 to 50. Then, an image of the image example 2 is displayed on the display unit of the imaging device 20. Specifically, the subjects X1 and X2, the view angle area 22 of the imaging device 20, the center line 22a of the horizontal view angle direction, and the center line 22b of the vertical view angle direction are displayed on the display unit of the imaging device 20. Furthermore, view angle areas 12-10, 12-11, 12-12, 22-10, and 22-11 are superimposed onto the view angle area 12 and displayed on the display unit 10J. The view angle area 12-10 is the view angle area 12 projected onto the view angle area 12. The view angle area 12-11 is the effective view angle area 12-2 projected onto the view angle area 12. The view angle area 12-12 is the effective rectangular view angle area 12-3 projected onto the view angle area 12. The view angle area 22-10 is the effective view angle area of the imaging device 20 projected onto the view angle area 22. The view angle area 22-11 is the effective rectangular view angle area of the imaging device 20 projected onto the view angle area 22. Furthermore, a center line 12a-10 of the horizontal view angle direction and a center line 12b-10 of the vertical view angle direction of the view angle area 12-10 are also displayed on the display unit.

Furthermore, the target intersection Pa is also displayed on the display unit. The definition of this target intersection Pa is as described above. Note that a center line of the horizontal view angle direction and a center line of the vertical view angle direction of other view angle areas may also be displayed. In addition, a center point of a view angle area instead of a center line of the view angle area may be displayed. Moreover, the view angle areas of other imaging devices 30 to 50 may also be displayed. In addition, for example, if a user's purpose is to match the optical axis 21 with the target intersection P, the view angle areas 12-10, 12-11, and 12-12 of the imaging device 10 may be omitted.

Even in this image example 2, a user can adjust the view angle area 22 more intuitively and easily. Furthermore, the user can intuitively and easily ascertain that the optical axis 11 of another imaging device 10 also deviates from the target intersection P. That is, the user can perform the same processing as in the image example 1.

<5-3. Image Example 3 Displayed on Imaging Device>

Figure 33:
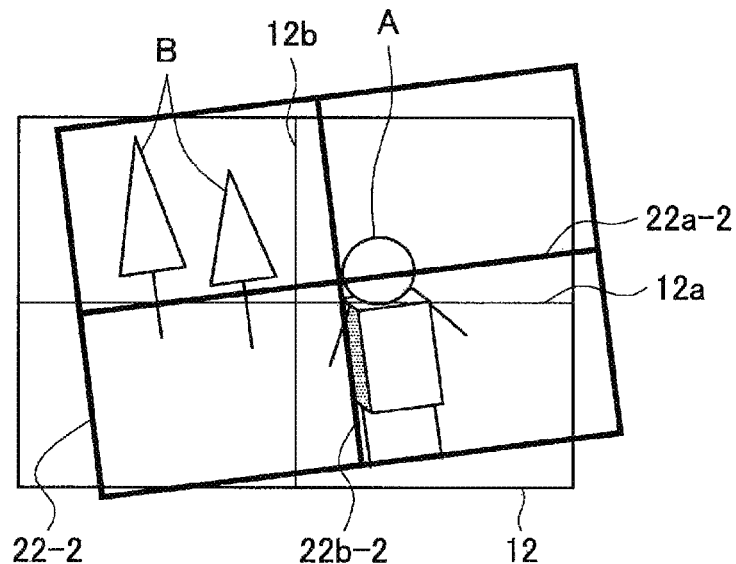
FIG. 33 is an explanatory view which shows an example of an image displayed on a display unit of each imaging device according to the present embodiment.

FIG. 33 shows an image example 3. In this image example 3, the subjects A and B are imaged by the imaging devices 10 and 20. Then, an image of the image example 3 is displayed on the display unit 10J of the imaging device 10. Specifically, the subjects A and B, the view angle area 22-2 of the imaging device 20, the center line 22a-2 of the horizontal view angle direction, and the center line 22b-2 of the vertical view angle direction are displayed on the display unit 10J of the imaging device 10. The definition of the view angle area 22-2 is as described above. Note that, in the imaging example 3, the view angle area 22-2 is shown as a substantially rectangle, but it will be distorted from the rectangle in accordance with an amount of deviation of the optical axis from a target intersection. The same applies to each image example below. In addition, other types of view angle areas, for example, view angel areas 12-4, 12-5, 22-3, 22-4, and the like (that is, the effective view angle area, the effective rectangular view angle area, and the like), may also be displayed. The same applies to each image example below.

In this example, a size of the view angle area 22-2 is substantially the same as that of the view angle area 12, but the horizontal view angle direction and the optical axis deviate. For this reason, a user can adjust the horizontal view angle direction and the optical axis. Note that, in a case in which a user's intention is, for example, to change the focal length of each imaging device, the user adjusts the focal length such that the size of the view angle area 22-2 is different from the size of the view angle area 12.

<5-4. Image Example 4 Displayed on Imaging Device>

Figure 34:
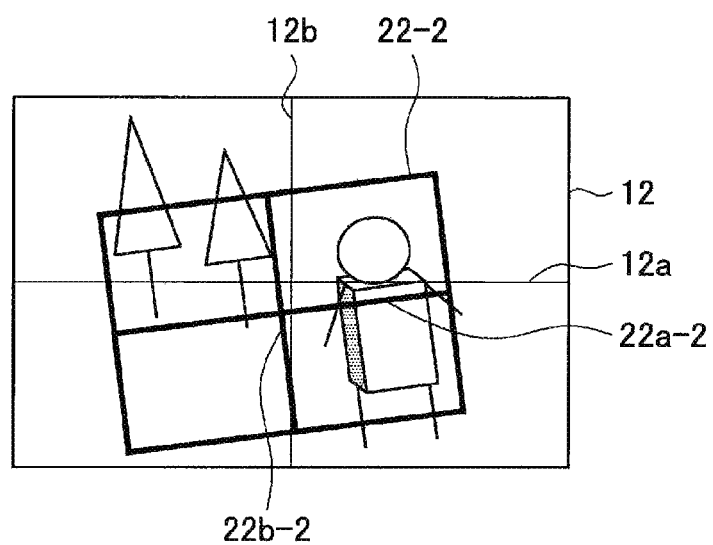
FIG. 34 is an explanatory view which shows an example of an image displayed on a display unit of each imaging device according to the present embodiment.

FIG. 34 shows an image example 4. In this image example 4, the subjects A and B are imaged by the imaging devices 10 and 20. Then, an image of the image example 4 is displayed on the display unit 10J of the imaging device 10. Specifically, the subjects A and B, the view angle area 22-2 of the imaging device 20, the center line 22a-2 of the horizontal view angle direction, and the center line 22b-2 of the vertical view angle direction are displayed on the display unit 10J of the imaging device 10. A definition of the view angle area 22-2 is as described above.

In this example, the size of the view angle area 22-2 is smaller than that of the view angle area 12, and the horizontal view angle direction and the optical axis thereof deviate. For this reason, a user can adjust the horizontal view angle direction and the optical axis. Note that, in a case in which a user intends to make the focal length of the imaging device 10 shorter than the focal length of the imaging device 20, the focal length does not have to be adjusted. However, if a user intends to align the focal lengths, the user adjusts the focal length such that the size of the view angle area 22-2 and the size of the view angle area 12 are aligned.

<5-5. Image Example 5 Displayed on Imaging Device>

Figure 35:
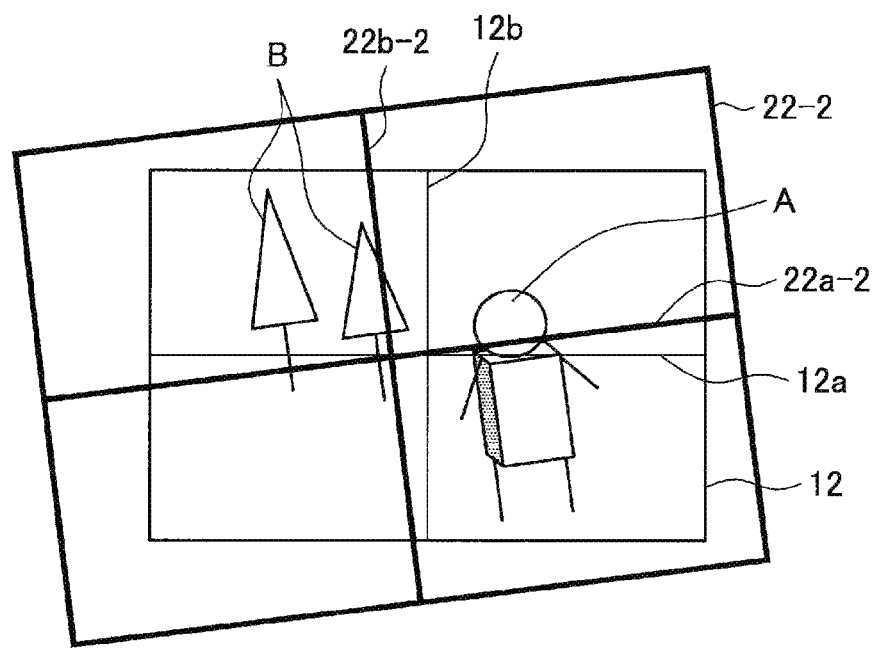
FIG. 35 is an explanatory view which shows an example of an image displayed on a display unit of each imaging device according to the present embodiment.

FIG. 35 shows an image example 5. In this image example 5, the subjects A and B are imaged by the imaging devices 10 and 20. Then, an image of the image example 5 is displayed on the display unit 10J of the imaging device 10. Specifically, the subjects A and B, the view angle area 22-2 of the imaging device 20, the center line 22a-2 of the horizontal view angle direction, and the center line 22b-2 of the vertical view angle direction are displayed on the display unit 10J of the imaging device 10. The definition of the view angle area 22-2 is as described above.

In this example, the size of the view angle area 22-2 is larger than that of the view angle area 12, and the horizontal view angle direction and the optical axis thereof deviate. For this reason, a user can adjust the horizontal view angle direction and the optical axis. Note that, in a case in which a user intends to make the focal length of the imaging device 10 longer than the focal length of the imaging device 20, the focal length does not have to be adjusted. However, in a case in which a user intends to align the focal lengths, the user adjusts the focal length such that the size of the view angle area 22-2 and the size of the view angle area 12 are aligned.

<5-6. Image Example 6 Displayed on Imaging Device>

Figure 36:
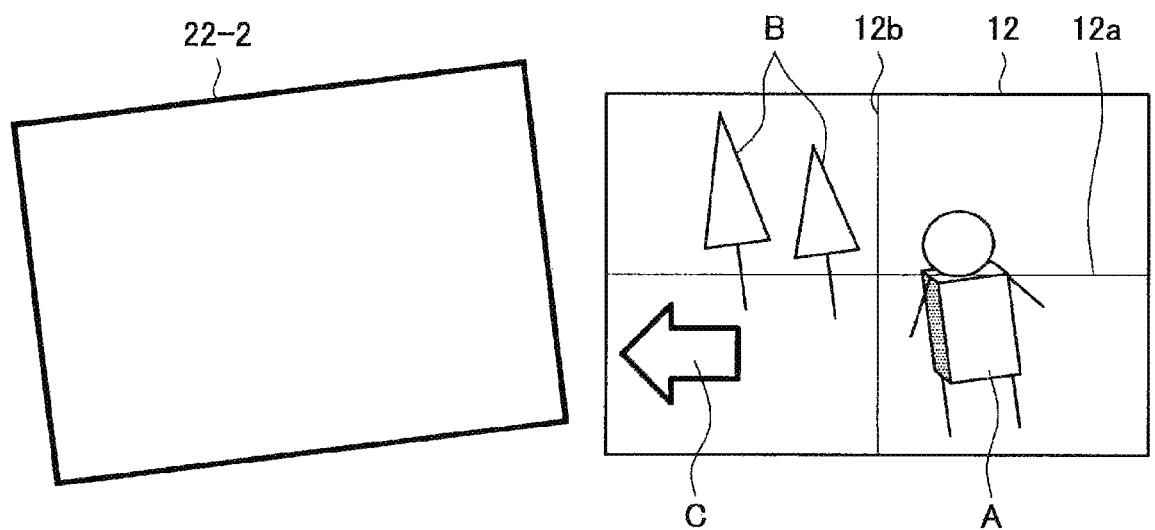
FIG. 36 is an explanatory view which shows an example of an image displayed on a display unit of each imaging device according to the present embodiment.

FIG. 36 shows an image example 6. In this image example 6, the subjects A and B are imaged by the imaging devices 10 to 50. Then, an image of the image example 6 is displayed on the display unit 10J of the imaging device 10. Specifically, the subjects A and B are displayed on the display unit 10J of the imaging device 10. However, in this example, the view angle area 22-2 of the imaging device 20 deviates greatly from the view angle area 12, and is outside the view angle area 12. For this reason, the view angle area 22-2 is not displayed in the view angle area 12. It is considered that this is because the optical axis of the imaging device 20 deviates largely from a direction intended by a user. In this case, the control unit 10H may display position indication information indicating a position of the view angle area 22-2 in the view angle area 12. In this example, the position indication information is an indicator C. In addition, in this example, the indicator C is an arrow image, but it goes without saying that the indicator C may be another type of indicator. The position of the view angle area 22-2 may be indicated by voice or the like. That is, the position indication information may also be voice information. Both image display and voice may also be used together. The definition of the view angle area 22-2 is as described above.

In this example, the optical axis of the view angle area 22-2 deviates greatly. For this reason, a user may first cause the view angle area 22-2 to be displayed in the view angle area 12 by adjusting the optical axis of the imaging device 20, and then perform the same processing as the image examples 3, 4, and 5.

(5-7. Image Example 7 Displayed on Imaging Device)

Figure 37:
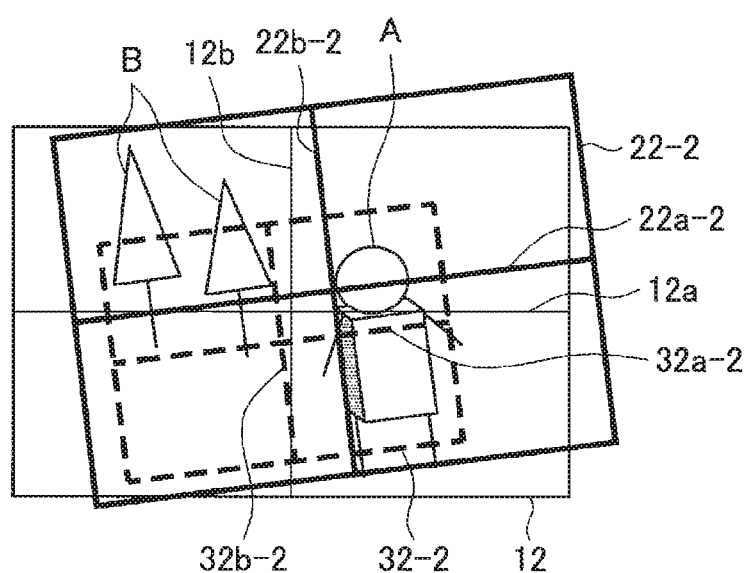
FIG. 37 is an explanatory view which shows an example of an image displayed on a display unit of each imaging device according to the present embodiment.

FIG. 37 shows an image example 7. In this image example 7, the subjects A and B are imaged by the imaging devices 10 to 30. Then, an image of the image example 7 is displayed on the display unit 10J of the imaging device 10. Specifically, the subjects A and B, the view angle area 22-2 of the imaging device 20, the center line 22a-2 of the horizontal view angle direction, and the center line 22b-2 of the vertical view angle direction are displayed on the display unit 10J of the imaging device 10. The definition of the view angle area 22-2 is as described above. Furthermore, a view angle area 32-2 of the imaging device 30, a center line 32a-2 of the horizontal view angle direction, and a center line 32b-2 of the vertical view angle direction are displayed on the display unit 10J. The view angle area 32-2 is a view angle area 32 of the imaging device 30 projected onto the view angle area 12.

In this example, the size of the view angle area 22-2 is substantially the same as that of the view angle area 12, and the horizontal view angle direction and the optical axis thereof deviate. In addition, the size of the view angle area 32-2 is smaller than that of the view angle area 12, and the horizontal view angle direction and the optical axis thereof deviate. For this reason, a user can adjust the imaging devices 10 to 30 such that the optical axes of the imaging devices 10 to 30 are aligned. Note that the target intersection Pa may also be displayed in the present image example 7. In addition, a user can adjust the horizontal view angle direction and the optical axis for the imaging devices 20 and 30. Moreover, in a case in which a user intends to make the focal length of the imaging device 10 shorter than the focal length of the imaging device 30, the focal length does not have to be adjusted. However, in a case in which a user intends to align the focal lengths, the user adjusts the focal length such that the size of the view angle area 32-2 and the size of the view angle area 12 are aligned. In addition, in a case in which a user intends to change the focal length of each imaging device, the user adjusts the focal length such that the size of the view angle area 22-2 is different from the size of the view angle area 12.

As described above, according to the present embodiment, the control unit 10H superimposes an adjustment view angle area for adjusting the view angle area of one imaging device onto the view angle area of any one imaging device among a plurality of imaging device. As a result, a user can adjust the view angle area more intuitively and easily.

Furthermore, the control unit 10H generates an adjustment view angle area on the basis of imaging device information regarding the plurality of imaging devices. As a result, the control unit 10H can generate an adjustment view angle area more accurately.

Furthermore, the control unit 10H transforms at least one of the view angle area of one imaging device or the view angle areas of other imaging devices on the basis of the imaging device information, and sets a transformed view angle area as an adjustment view angle area. As a result, the control unit 10H can generate an adjustment view angle area more accurately.

Furthermore, the control unit 10H calculates a target intersection of the optical axes of the plurality of imaging devices, and transforms at least one of the view angle area of one imaging device or the view angle areas of other imaging devices on the basis of the target intersection. As a result, the control unit 10H can generate an adjustment view angle area more accurately.

Furthermore, the control unit 10H adjusts the imaging device information such that the optical axis of one imaging device is directed to the target intersection, and transforms the view angle area of one imaging device on the basis of the adjusted imaging device information. As a result, the control unit 10H can generate an adjustment view angle area more accurately.

Furthermore, the control unit 10H extracts a rectangular view angle area from the transformed view angle area of one imaging device, and sets the rectangular view angle area as an adjustment view angle area. As a result, the control unit 10H can generate an adjustment view angle area more accurately.

Furthermore, the control unit 10H adjusts the imaging device information such that the optical axes of other imaging devices are directed to the target intersection, and transforms the view angle areas of the other imaging devices on the basis of the adjusted imaging device information. As a result, the control unit 10H can generate an adjustment view angle area more accurately.

Furthermore, the control unit 10H extracts a rectangular view angle area from the transformed view angle area of the other imaging device, and sets the rectangular view angle area as an adjustment view angle area. As a result, the control unit 10H can generate an adjustment view angle area more accurately.

Furthermore, the control unit 10H superimposes the target intersection onto the view angle area of one imaging device. As a result, a user can adjust the view angle area more intuitively and easily.

Furthermore, the imaging device information includes the installation positions, focal lengths, and image sensor sizes of the plurality of imaging devices. As a result, the control unit 10H can generate an adjustment view angle area more accurately.

Furthermore, the control unit 10H superimposes characteristic information indicating a characteristic position of an adjustment view angle area onto the adjustment view angle area. As a result, a user can adjust the view angle area more intuitively and easily.

Here, the control unit 10H sets at least one of a center line of the horizontal view angle direction, a center line of the vertical view angle direction, or a center point of an adjustment view angle area as characteristic information. As a result, a user can adjust the view angle area more intuitively and easily.

Furthermore, the processing described above is performed by an imaging device. Therefore, an imaging device can display the adjustment view angle area described above more quickly.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, in the embodiment described above, although an imaging device is in a form of so-called camera, the present technology can be suitably applied to a device that performs imaging, for example, a smart phone, a mobile phone, and the like. In addition, the processing of FIG. 18 may also be performed a device other than the imaging devices 10 to 50, for example, the arithmetic device 600.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing device including:

a control unit which superimposes an adjustment view angle area for adjusting a view angle area of one imaging device among a plurality of imaging devices onto the view angle area of the one imaging device.

(2)

The information processing device according to (1), in which the control unit generates the adjustment view angle area on a basis of imaging device information regarding the plurality of imaging devices.

(3)

The information processing device according to (2), in which the control unit transforms at least one of the view angle area of the one imaging device or view angle areas of other imaging devices on the basis of the imaging device information, and sets a transformed view angle area as the adjustment view angle area.

(4)

The information processing device according to (3), in which the control unit calculates a target intersection of optical axes of the plurality of imaging devices on the basis of the imaging device information, and transforms at least one of the view angle area of the one imaging device or the view angle areas of the other imaging devices on a basis of the target intersection.

(5)

The information processing device according to (4), in which the control unit adjusts the imaging device information such that an optical axis of the one imaging device is directed to the target intersection, and transforms the view angle area of the one imaging device on a basis of the adjusted imaging device information.

(6)

The information processing device according to (5), in which the control unit extracts a rectangular view angle area from the transformed view angle area of the one imaging device, and sets the rectangular view angle area as the adjustment view angle area.

(7)

The information processing device according to any one of (4) to (6), in which the control unit adjusts the imaging device information such that the optical axes of the other imaging devices are directed to the target intersection, and transforms the view angle areas of the other imaging devices on a basis of the adjusted imaging device information.

(8)

The information processing device according to (7), in which the control unit extracts rectangular view angle areas from the transformed view angle areas of the other imaging devices, and sets the rectangular view angle areas as the adjustment view angle areas.

(9)

The information processing device according to any one of (4) to (8), in which the control unit superimposes the target intersection onto the view angle area of the one imaging device.

(10)

The information processing device according to any one of (2) to (9), in which the imaging device information is information regarding angle of views of the plurality of imaging devices.

(11)

The information processing device according to (10), in which the imaging device information includes at least one type of installation positions, postures, focal lengths, or image sensor sizes of the plurality of imaging devices.

(12)

The information processing device according to any one of (1) to (11), in which the control unit superimposes characteristic information indicating a characteristic portion of the adjustment view angle area onto the adjustment view angle area.

(13)

The information processing device according to (12), in which the control unit sets at least one type of a center line of a horizontal view angle direction, a center line of a vertical view angle direction, or a center point of the adjustment view angle area as the characteristic information.

(14)

The information processing device according to any one of (1) to (13), in which the control unit presents position indication information indicating a position of the adjustment view angle area in a case in which the adjustment view angle area is outside the view angle area of the one imaging device.

(15)

The information processing device according to any one of (1) to (14), in which the information processing device is the one imaging device.

(16)

An information processing method including:
superimposing, by a processor, an adjustment view angle area for adjusting a view angle area of one imaging device among a plurality of imaging devices onto the view angle area of the one imaging device.

(17)

A program which causes a computer to realize a control function of superimposing an adjustment view angle area for adjusting a view angle area of one imaging device among a plurality of imaging devices onto the view angle area of the one imaging device.

REFERENCE SIGNS LIST

10 to 50 imaging device
10A lens
10B aperture
10C image sensor
10D preprocessing unit
10E radio wave detection unit
10F image quality adjusting unit
10G post processing unit
10H control unit
10I storage unit
10J display unit
10K lens driving unit
10L input operation unit
10M communication unit
600 arithmetic device
610 communication unit
620 display unit
630 input operation unit
640 control unit

The invention claimed is:

1. An information processing device comprising:
control unit circuitry configured to:
process imaging device information from a plurality of imaging devices in a manner that permits the control unit circuitry to calculate a target intersection of optical axes of the imaging devices, and
process the target intersection in a manner that permits the control unit circuitry to transform a view angle area for one of the imaging devices into a transformed view angle area.

2. The information processing device according to claim 1,
wherein the information processing device is the one of the imaging devices.

3. The information processing device according to claim 1,
wherein the imaging device information includes at least one type of installation positions, postures, focal lengths, or image sensor sizes of the imaging devices.

4. The information processing device according to claim 1,
wherein the control unit circuitry is configured to adjust the imaging device information such that an optical axis of the one imaging device is directed to the target intersection.

5. The information processing device according to claim 1,
wherein the control unit circuitry is configured to adjust the imaging device information such that the optical axes of the imaging devices are directed to the target intersection.

6. The information processing device according to claim 5,
wherein the control unit circuitry is configured to generate the transformed view angle area after the control unit circuitry has adjusted the imaging device information.

7. The information processing device according to claim 1,
wherein the control unit circuitry is configured to set the transformed view angle area as an adjustment view angle area.

8. The information processing device according to claim 7,
wherein the control unit circuitry is configured to present position indication information indicating a position of the adjustment view angle area in a case in which the adjustment view angle area is outside the view angle area of the one imaging device.

9. The information processing device according to claim 7,
wherein the control unit circuitry is configured to superimpose the adjustment view angle area onto the view angle area for the one of the imaging devices.

10. The information processing device according to claim 7,
wherein control unit circuitry is configured to generate, based on the imaging device information, the adjustment view angle area.

11. The information processing device according to claim 7,
wherein the control unit circuitry is configured to calculate the target intersection after the control unit circuitry has adjusted the imaging device information.

12. The information processing device according to claim 11,
wherein the control unit circuitry is configured to extract a rectangular view angle area from the transformed view angle area.

13. The information processing device according to claim 11,
wherein the control unit circuitry is configured to set the rectangular view angle area as the adjustment view angle area.

14. The information processing device according to claim 7,
wherein the control unit circuitry is configured to superimpose characteristic information indicating a characteristic portion of the adjustment view angle area onto the adjustment view angle area.

15. The information processing device according to claim 14,
wherein the control unit circuitry is configured to set at least one type of a center line of a horizontal view angle direction, a center line of a vertical view angle direction, or a center point of the adjustment view angle area as the characteristic information.

16. An information processing method comprising:
processing, by control unit circuitry, imaging device information from a plurality of imaging devices in a manner that causes the control unit circuitry to calculate a target intersection of optical axes of the imaging devices; and
processing, by the control unit circuitry, the target intersection in a manner that causes the control unit circuitry to transform a view angle area for one of the imaging devices into a transformed view angle area.

17. The information processing method according to claim 16, further comprising:
adjusting, by the control unit circuitry, the imaging device information such that the optical axes of the imaging devices are directed to the target intersection.

18. The information processing method according to claim 16, further comprising:
setting, by the control unit circuitry, the transformed view angle area as an adjustment view angle area.

19. The information processing method according to claim 18,
wherein the control unit circuitry superimposes the adjustment view angle area onto the view angle area for the one of the imaging devices.

20. A non-transitory processor-readable medium having computer code embodied thereon, the computer code when executed by an information processing device causes the information processing device to execute the information processing method according to claim 16.

* * * * *

UNITED STATES PATENT AND TRADEMARK OFFICE
CERTIFICATE OF CORRECTION

PATENT NO. : 10,606,149 B2
APPLICATION NO. : 16/094333
DATED : March 31, 2020
INVENTOR(S) : Nobuho Ikeda et al.

Page 1 of 1

It is certified that error appears in the above-identified patent and that said Letters Patent is hereby corrected as shown below:

On the Title Page

Item (56) FOREIGN PATENT DOCUMENTS:
Please replace "JP 2011-1320234 A," with -- JP 2011-130234 A --

Signed and Sealed this
Twenty-eighth Day of July, 2020

Andrei Iancu
*Director of the United States Patent and Trademark Office*